United States Patent [19]
Tanaka

[11] Patent Number: 6,018,573
[45] Date of Patent: Jan. 25, 2000

[54] MOBILITY MANAGEMENT SYSTEM IN PERSONAL COMMUNICATION SYSTEM

[75] Inventor: Shoji Tanaka, Tokyo, Japan

[73] Assignee: NEC Corporation, Tokyo, Japan

[21] Appl. No.: 08/995,859

[22] Filed: Dec. 22, 1997

[30] Foreign Application Priority Data

Dec. 26, 1996 [JP] Japan .................................. 8-348553

[51] Int. Cl.⁷ ............................... H04M 3/42; H04J 3/02
[52] U.S. Cl. .......................... 379/211; 455/422; 455/432; 455/435; 342/457
[58] Field of Search ..................................... 379/210, 211, 379/212, 201; 455/422, 432, 433, 435, 436, 456; 340/825.49, 825.72; 342/457, 357.07, 357.01, 44

[56] References Cited

U.S. PATENT DOCUMENTS

| | | | |
|---|---|---|---|
| 5,353,331 | 10/1994 | Emery et al. | 379/207 |
| 5,546,445 | 8/1996 | Dennison et al. | 379/114 |
| 5,901,359 | 5/1999 | Malmstrom | 379/207 |

FOREIGN PATENT DOCUMENTS

| | | |
|---|---|---|
| 2-95037 | 4/1990 | Japan . |
| 3-283898 | 12/1991 | Japan . |
| 5-308674 | 11/1993 | Japan . |
| 6-209489 | 7/1994 | Japan . |
| 7-12988 | 5/1995 | Japan . |
| 7-162942 | 6/1995 | Japan . |
| 7-264653 | 10/1995 | Japan . |

OTHER PUBLICATIONS

S. Tabbane et al., "An Intelligent Location Tracking Method for Personal and Terminal FPLMTS/UMTS Communications", vol. 1, (Apr. 1995), pp. 114–118.

*Primary Examiner*—Krista Zele
*Assistant Examiner*—Benny Q. Tieu
*Attorney, Agent, or Firm*—Foley & Lardner

[57] ABSTRACT

A subscriber normally uses telephone sets 1 and 2 and a facsimile machine 3 accommodated in a wired telephone network 4, a subscriber terminal unit 10 that is a handy phone accommodated in a low speed mobile communication network 5, and a subscriber terminal unit 11 that is a portable telephone set accommodated in a high speed mobile communication network 6. Each of the networks is connected to a home database 7 to which the subscriber has subscribed. The home database 7 shares mobility management information for tracking a subscriber to which a call is connected in the wired communication system and mobility management information for registering the location of the subscriber who travels in the mobile communication system. The home database 7 updates the mobility management information for tracking the location of the subscriber with a location registration update request signal issued by the subscriber and changes the subscriber tracking priority.

27 Claims, 14 Drawing Sheets

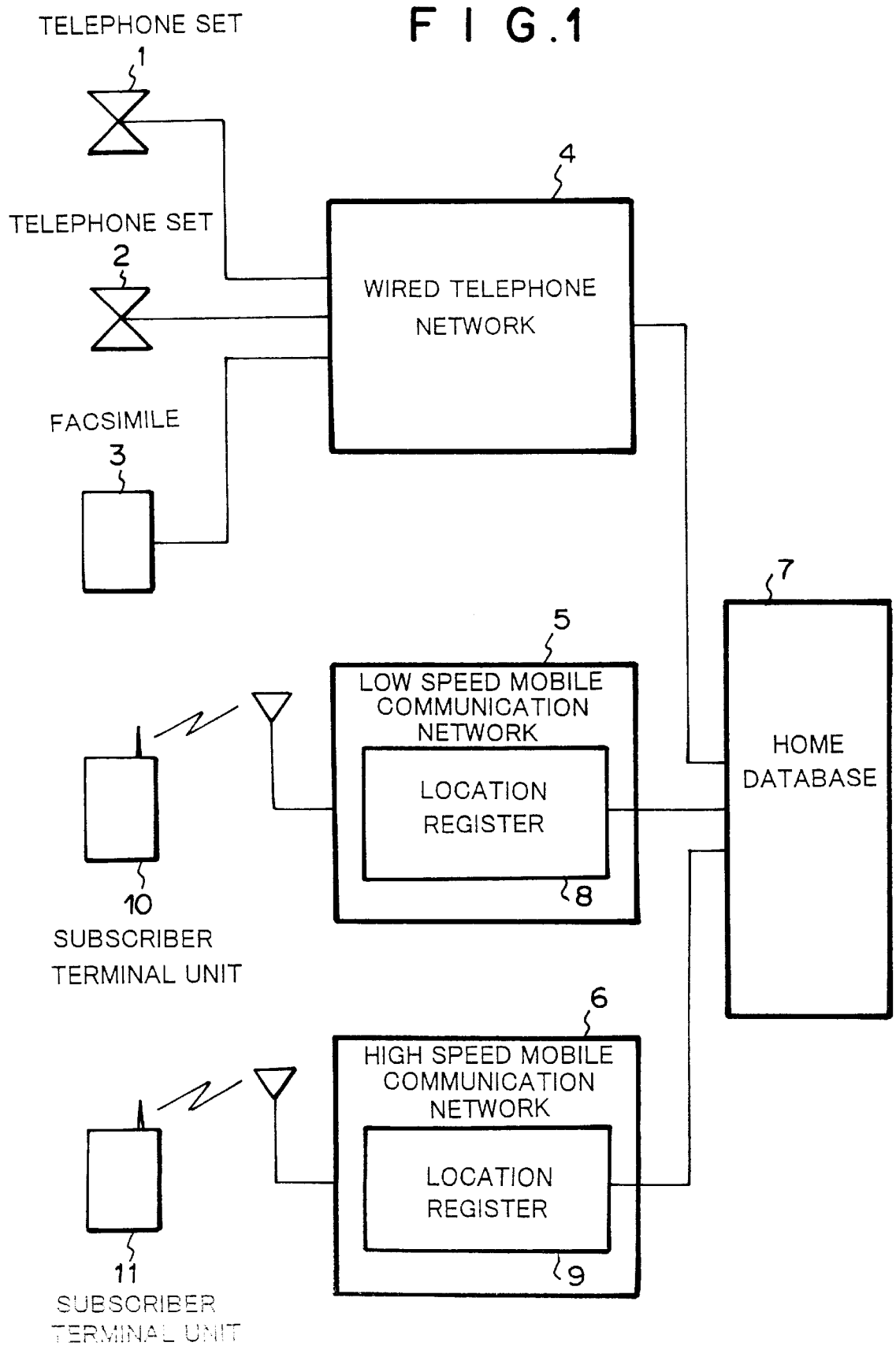

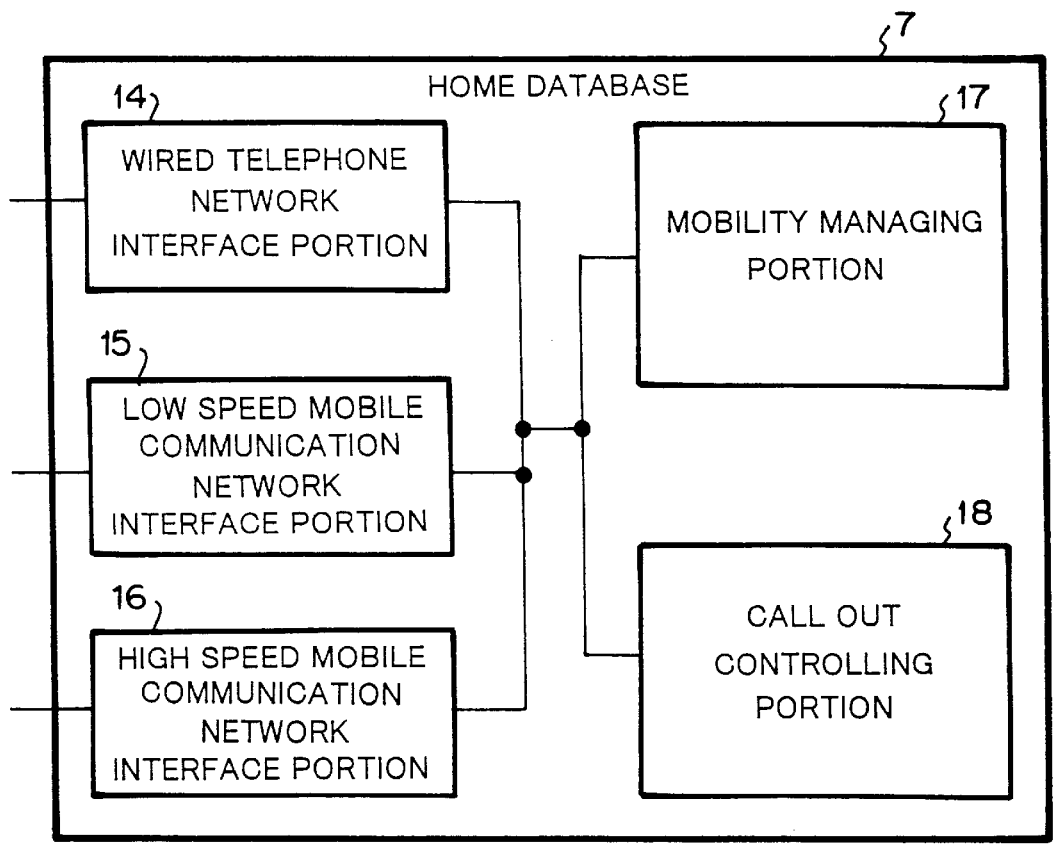

F I G. 3

| SUBSCRIBER NUMBER | 1 2 3 4 5 6 7 8 9 | |
|---|---|---|
| SUBSCRIBER NAME | A | |
| SUBSCRIBER CERTIFICATION VALUE | 1 9 5 9 3 4 0 7 2 4 | |
| ORDER DESIGNATION INFORMATION - A | INDIVIDUAL DESIGNATION | |
| TRACKING CONTROL INFORMATION - A | INDIVIDUAL DESIGNATION | |
| TIME - TIME | 17 : 00 - 20 : 00 | |
| LOCATION REGISTERED NETWORK/MEANS - (1) | LOW SPEED MOBILE COMMUNICATION NETWORK SUBSCRIBER TERMINAL | TRACKING INFORMATION BLOCK (1) |
| CALL IN ADDRESS - (1) | 0 5 0 5 5 5 1 2 3 4 5 | |
| ORDER DESIGNATION INFORMATION - (1) | SECOND PRIORITY | |
| TRACKING CONTROL INFORMATION - (1) | NEXT TRACKING UPON ABSENCE | |
| LOCATION REGISTERED NETWORK/MEANS - (2) | WIRED TELEPHONE NETWORK TELEPHONE SET | TRACKING INFORMATION BLOCK (2) |
| CALL IN ADDRESS - (2) | 0 3 4 4 4 1 2 3 4 5 | |
| ORDER DESIGNATION INFORMATION - (2) | FIRST PRIORITY | |
| TRACKING CONTROL INFORMATION - (2) | NEXT TRACKING UPON NO RESPONSE | |
| LOCATION REGISTERED NETWORK/MEANS - (3) | HIGH SPEED MOBILE COMMUNICATION NETWORK SUBSCRIBER TERMINAL UNIT | TRACKING INFORMATION BLOCK (3) |
| CALL IN ADDRESS - (3) | 0 3 0 3 3 3 1 2 3 4 | |
| ORDER DESIGNATION INFORMATION - (3) | FIRST PRIORITY | |
| TRACKING CONTROL INFORMATION - (3) | NEXT TRACKING UPON ABSENCE | |
| LOCATION REGISTERED NETWORK/MEANS - (4) | WIRED TELEPHONE NETWORK FACSIMILE | TRACKING INFORMATION BLOCK (4) |
| CALL IN ADDRESS - (4) | 0 3 4 4 4 2 3 4 5 6 | |
| ORDER DESIGNATION INFORMATION - (4) | NO PRIORITY CHANGE | |
| TRACKING CONTROL INFORMATION - (4) | NEXT TRACKING UPON NO RESPONSE | |

FIG.4

| SUBSCRIBER NUMBER | 1 2 3 4 5 6 7 8 9 |
|---|---|
| SUBSCRIBER CERTIFICATION NUMBER | 1 9 5 6 3 1 1 2 0 3 |
| LOCATION REGISTERED NETWORK/MEANS - N | HIGH SPEED MOBILE COMMUNICATION NETWORK TERMINAL UNIT SUBSCRIBER |
| CALL IN ADDRESS - N | 0 3 0 3 3 3 1 2 3 4 |
| ORDER DESIGNATION INFORMATION - N | NO PRIORITY CHANGE |
| TRACKING CONTROL INFORMATION - N | 02 NO TRACKING OBJECT |
| LOCATION REGISTERED NETWORK/MEANS - 01 | — |
| LOCATION REGISTERED NETWORK/MEANS - 02 | WIRED TELEPHONE NETWORK FACSIMILE |

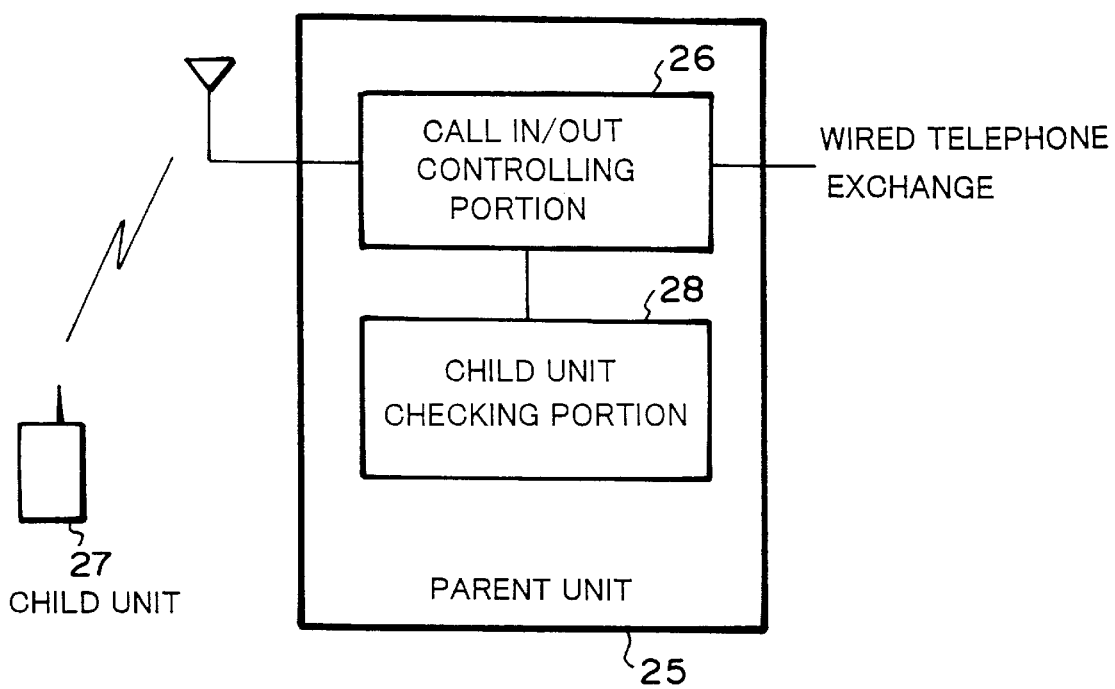

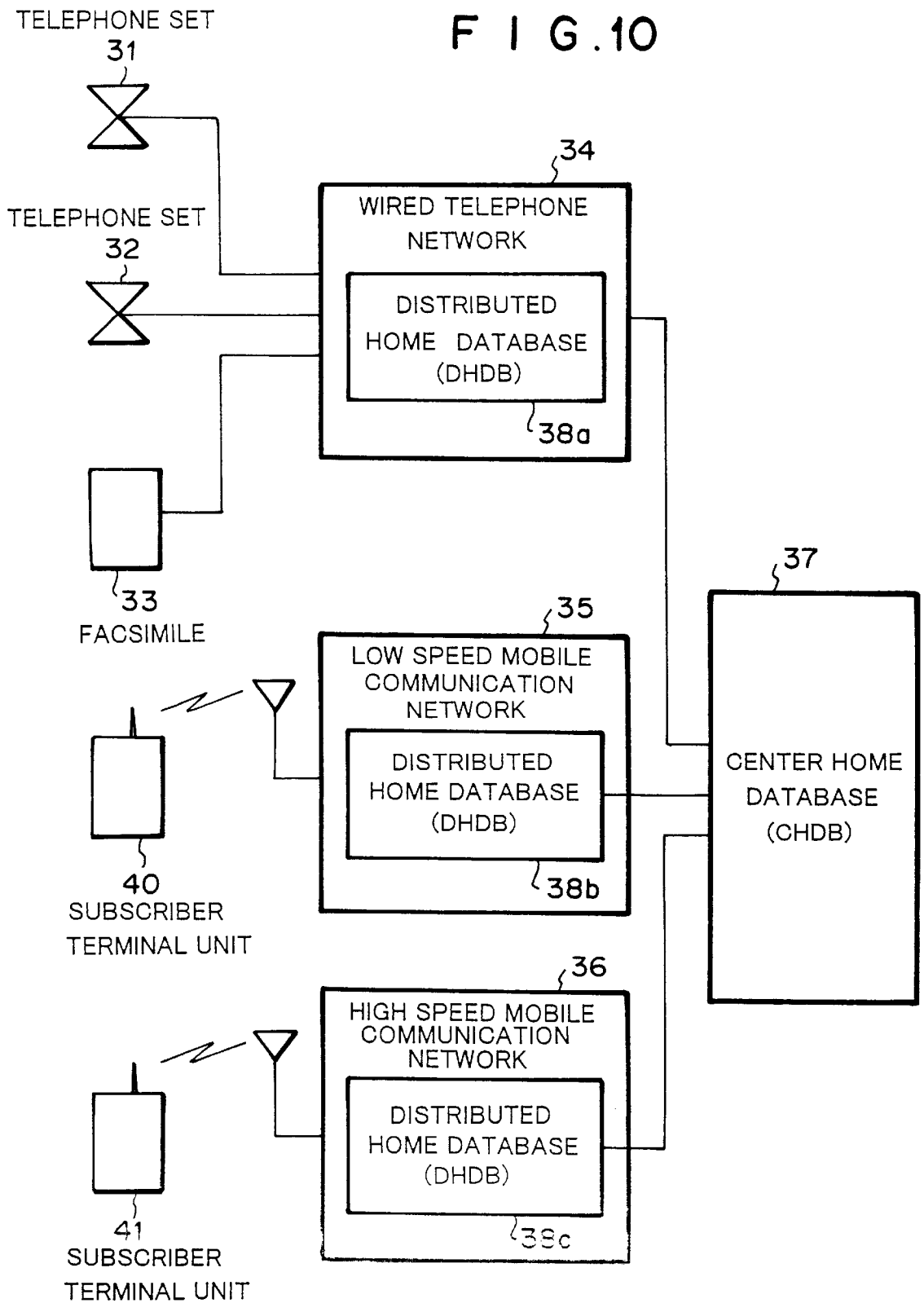

F I G. 11A
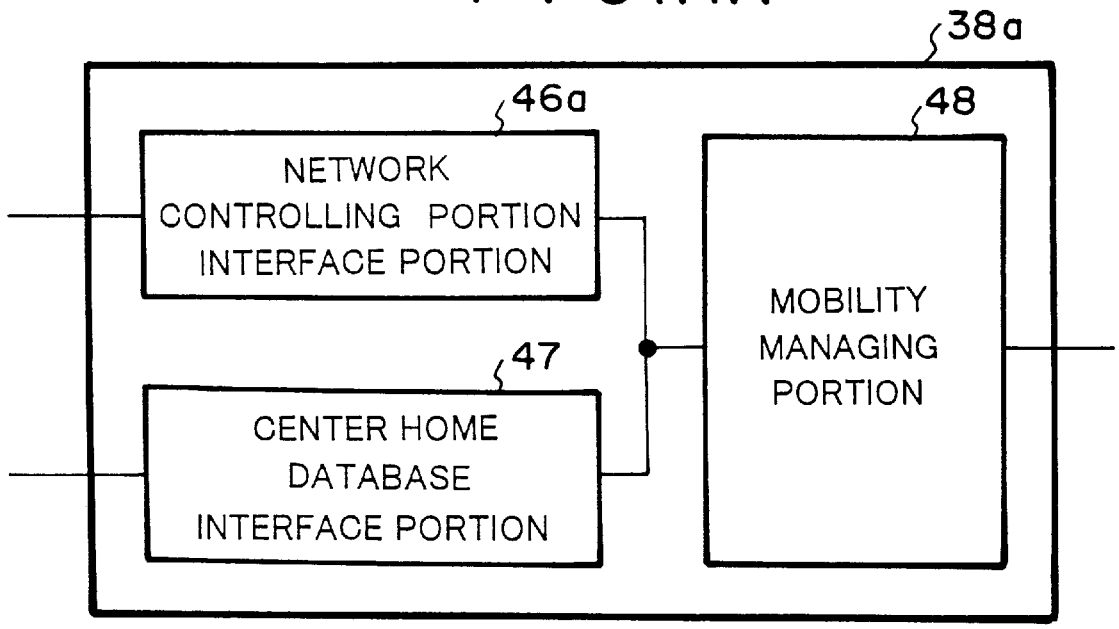
F I G. 11B
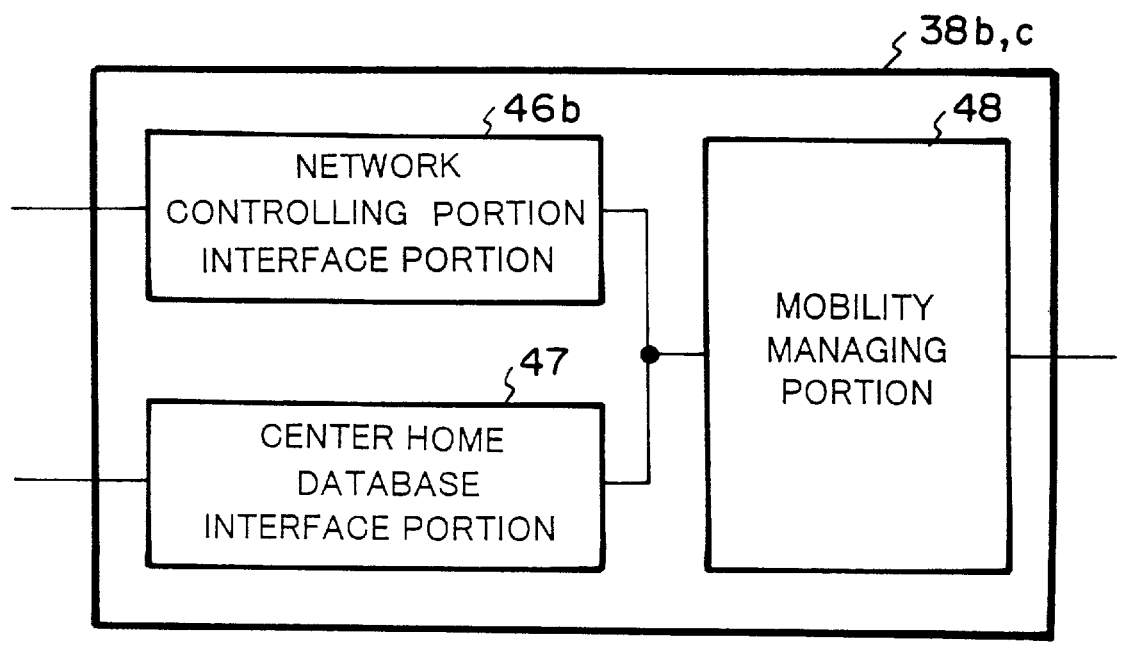

FIG. 12

| SUBSCRIBER NUMBER | 1 2 3 4 5 6 7 8 9 | |
|---|---|---|
| SUBSCRIBER NAME | A | |
| SUBSCRIBER CERTIFICATION VALUE | 1 9 5 9 3 4 0 7 2 4 | |
| ORDER DESIGNATION INFORMATION - A | INDIVIDUAL DESIGNATION | |
| TRACKING CONTROL INFORMATION - A | INDIVIDUAL DESIGNATION | |
| TIME - TIME | 1 7 : 0 0 - 2 0 : 0 0 | |
| LOCATION REGISTERED NETWORK/MEANS - (1) | LOW SPEED MOBILE COMMUNICATION NETWORK SUBSCRIBER TERMINAL | TRACKING INFORMATION BLOCK (1) |
| DHDB ADDRESS - (1) | 0 5 0 5 5 5 1 2 3 4 5 | |
| ORDER DESIGNATION INFORMATION - (1) | SECOND PRIORITY | |
| TRACKING CONTROL INFORMATION - (1) | NEXT TRACKING UPON ABSENCE | |
| LOCATION REGISTERED NETWORK/MEANS - (2) | WIRED TELEPHONE NETWORK TELEPHONE SET | TRACKING INFORMATION BLOCK (2) |
| DHDB ADDRESS - (2) | 0 3 4 4 4 1 2 3 4 5 | |
| ORDER DESIGNATION INFORMATION - (2) | FIRST PRIORITY | |
| TRACKING CONTROL INFORMATION - (2) | NEXT TRACKING UPON NO RESPONSE | |
| LOCATION REGISTERED NETWORK/MEANS - (3) | HIGH SPEED MOBILE COMMUNICATION NETWORK SUBSCRIBER TERMINAL UNIT | TRACKING INFORMATION BLOCK (3) |
| DHDB ADDRESS - (3) | 0 3 0 3 3 3 1 2 3 4 | |
| ORDER DESIGNATION INFORMATION - (3) | FIRST PRIORITY | |
| TRACKING CONTROL INFORMATION - (3) | NEXT TRACKING UPON ABSENCE | |

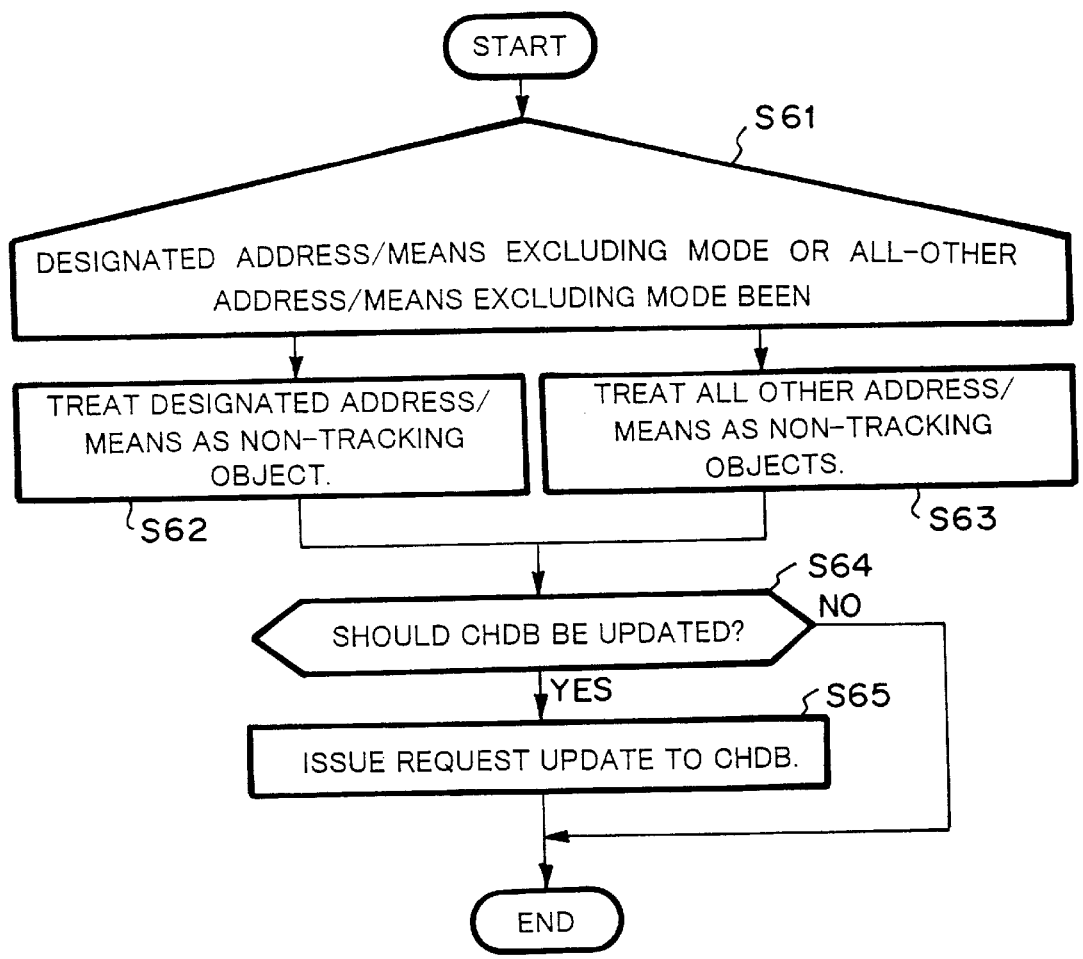

MOBILITY MANAGEMENT SYSTEM IN PERSONAL COMMUNICATION SYSTEM

BACKGROUND OF THE INVENTION

1. Field of the Invention

The present invention relates to a mobility management system in a personal communication system and in particular, a mobility management system in a personal communication system in which the mobility of a communication terminal unit in the field of the personal communication is considered.

2. Description of the Prior Art

As an example of a mobility management system in a conventional personal communication system, a location updating system that updates the content of a location register upon traveling of a subscriber terminal unit among location registered areas is known. Next, a conventional location Ail updating system will be explained. FIG. 14 is a schematic diagram showing the structure of a network of a conventional location updating system. There are various mobile communication systems that have been structured by different communication companies. In each mobile communication system, the service area thereof is subdivided into several sub-areas. These sub-divided areas are designated as location registered areas. To allow a subscriber terminal unit to have a service of the mobile communication network, the subscriber terminal unit is registered in a location register in one of the location registered areas. In other words, when a subscriber terminal unit is initially used in the mobile communication system, the location of the subscriber terminal unit is registered with a database (that is referred to as a location register) in a home memory station. Thereafter, whenever the subscriber terminal 0 5 unit travels and thereby the location registered area varies, the subscriber terminal unit issues a location registration change request. There are two types of location registers that are a home location register (HLR) and a visiting location register (VLR). These location registers manage location registration information corresponding to the terminal number of each subscriber terminal unit. When a call is made to a subscriber terminal unit, the location registered area of the subscriber terminal unit is searched and the call is directed to the searched location registered area. When communication companies of adjacent mobile communication systems tie up for a roaming service, even if a subscriber terminal unit enters the service area of a mobile communication system to which the unit does not subscribe, with a location registration change request, the location registration information of the home location register of the communication company to which the subscriber has subscribed and the visiting location register of the tied-up communication company can be updated. In addition, when the mobile terminal unit is accepting the roaming service, roaming number is temporarily assigned to the subscriber terminal for identifying the terminal and the roaming number is managed in location registers. Thus, even if the subscriber terminal unit enters any service area, the location thereof is updated and connection to the called subscriber terminal unit is enabled.

In FIG. 14, it is assumed that after the subscriber of terminal unit 71 makes a subscription contract with a communication company which operates the mobile communication system having the service area of area 81, subscriber information of terminal unit 71 is stored in a subscriber memory of home location register 74 and managed therewith. When terminal unit 71 travels from location registered area 82 in area 81 to location registered area 83 in area 81, terminal unit 71 causes visiting location register 76 of mobile communication exchanger 73 to change the registered location of terminal unit 71. Visiting location register 76 assigns location registration information and a roaming number to terminal unit 71. Visiting location register 76 informs home location register 74 of the location registration information and the roaming number assigned to terminal unit 71. Thus, home location register 74 updates the location registration information of terminal unit 71 and assigns the roaming number to terminal unit 71 corresponding to the information received from visiting location register 76. In this state, when mobile communication exchanger 72 receives calling (originating) signal to terminal unit 71, mobile communication exchanger 72 asks home location register 74 for location information of terminal unit 71. Thus, mobile communication exchanger 72 knows that terminal unit 71 is traveling in location registered area 83 that is under the control of mobile communication exchanger 73. In addition, mobile communication exchanger 72 receives the roaming number for the call in from home location register 74 and makes mobile communication exchanger 73 performs the process for call in to the terminal unit 71 represented by the roaming number. Receiving call in from mobile communication exchanger 72, mobile communication exchanger retrieves location registered area 83 in which terminal unit 71 exists and the terminal number of terminal unit 71 by locating the roaming number in visiting location register 76. The terminal number may be a temporary number for a security reason. Mobile communication exchanger 73 calls terminal 71 in a call area, namely the location registered area 83. When terminal unit 71 responds to the call, mobile communication exchanger 73 connects the call in line and a communication channel to terminal unit 71 so as to start a communication between the caller and the terminal unit 71. The call area is normally the same as a location registered area. When a subscriber terminal unit makes a call, the registered location thereof may be automatically changed in a mobile communication exchanger and location registers.

Such a location updating system is explained in, for example, Japanese Patent Laid-Open Publications 07-264653, 07-162942, 07-129488, 06-209489, 03-283898, 02-095037 and GSM system standard (ETSI/TC GSM, Released by ESTI/PT, Released in March, 1990), PDC (Personal Digital Cellular) system standard, and IS-95 system standard (TIA/EIA/IS-95, July 1993). Next, location updating systems explained in these Patent Laid-Open publications and documents of these standards will be explained in brief.

In Japanese Patent Laid-Open Publication 07-264653, a technology of a mobile telephone system is disclosed. In this system, a mobile telephone used as an independent mobile telephone and a cordless telephone which subordinates to a parent telephone is included therein. When the mobile telephone is switched to the cordless telephone, the telephone number of the parent telephone is automatically registered as call in transfer information with a location register that manages location information in the mobile telephone system. When a call is made to the mobile telephone set, the call is transferred to the parent telephone.

In Japanese Patent Laid-Open Publication 07-162942, a technology of a system that has a plurality of mobile communication exchangers that control routing of calls in the same location registered area is disclosed. In this system, when a call is disconnected, a routing number of a subscriber terminal unit is updated in a location register. Thus, in the same location registered area, an optimum routing number can be updated.

In Japanese Patent Laid-Open Publication 07-129488, a technology of a local area mobile communication system is disclosed. In this system, the location of a terminal unit is updated between local area networks.

In Japanese Patent Laid-Open Publication 06-209489, a technology of a radio communication system is disclosed. In this system, when terminal units are concentrated in a particular controlling station, a management station that manages location information of the entire service area shares the load with the controlling station so as to prevent the controlling station from congesting.

In Japanese Patent Laid-Open Publication 03-283898, a technology of a radio communication system that has a plurality of home location registers is disclosed. In this system, when there are many calls in a visitor area other than a home area, the calls are controlled with a home memory on the visitor side as if these calls are in the home area. Thus, the number of occurrences of accessing operation to a home location register is reduced, thereby preventing the home location register from congesting.

In Japanese Patent Laid-Open Publication 02-095037, a technology of a radio communication system is disclosed. In this system, location registration information is locally managed in a radio base station in a zone in which a mobile station is present. When a call is made to a mobile telephone, call in information is sent to all base stations. Each base station searches the mobile telephone with location registration information managed therein and determines whether or not to call the mobile telephone.

In the GSM system standard, a registered location can be deleted and a new location can be registered.

In addition, as another example of the mobility management system in the personal communication system, there is a location tracking system that manages the mobility of subscribers as well as terminal units. Next, this location tracking system will be explained. FIG. 15 is a schematic diagram showing the structure of the location tracking system in a personal communication system. In a personal communication system, when each subscriber subscribes to the network, the subscriber is assigned a unique personal number, namely a unique subscriber number. In a mobile communication system, a tracking object is a subscriber. Terminal units that the subscriber will use are registered corresponding to the schedule which is determined for months, days, days of the week, and time. When a call is made to the subscriber, a terminal unit designated corresponding to the schedule is called. Subscriber information for tracking the location of the subscriber is managed by a home database (HDB). The subscriber information includes, for example, a subscriber number assigned to each subscriber and a subscriber certification number assigned to each subscriber. The home database manages terminal numbers of a plurality of call in terminal units that will be used corresponding to the schedule of each subscriber. In FIG. 15, it is assumed that a home database 86 of a home network 87 manages subscriber numbers, subscriber certification numbers, date and time of schedule, and terminal numbers used corresponding to the schedule for each subscriber as a part of subscriber information. In addition, it is assumed that the home database manages a primary terminal unit and a secondary terminal unit that will be used corresponding to the schedule. When the communication network 88 calls the subscriber at a certain date/time on the schedule, the home network 87 asks the home database 86 for the destination of the call corresponding to the subscriber number as well as the data/time. At this point, home network 87 performs a call in process with the terminal number of primary terminal unit 92 received from the home database 86. In this case, a communication network 89 is selected for call in. When terminal unit 92 in communication network 89 is busy or does not respond, home network 87 receives the terminal number of secondary terminal unit 93 from home database 86 and performs a call in process for secondary terminal unit 93. In this case, a communication network 90 is selected for call in. When terminal unit 93 in communication network 90 responds to the call in, home network 87 connects a communication channel between communication network 88 as the call out (terminating) network and communication network 90 as the secondary call out so as to start a communication between terminal unit 91 and terminal unit 93.

As technical papers that describe technologies of such a location tracking system, there are Japanese Patent Laid-Open Publication 05-308674 and "An intelligent location tracking method for personal and terminal FPLMTS/UMTS communications". In the former, a technology for presuming the transfer of a subscriber and executing a call in to the subscriber even if location information is lost is disclosed therein. In the latter, a technology of generating location tracking pattern information by learning location updating events for a certain period is disclosed.

In a conventional location updating system in a personal communication system, even if a subscriber terminal unit is present in a location registered area to which location information is updated most recently, in case that the unit is in a building that shields a radio wave, a call in to the unit may not be reached thereto and the call in may be abandoned. In this case, the caller may hear a message saying that the objective person is out of the network. Thus, the caller will retry to call another terminal unit through which the caller supposes communication will be established.

In a conventional location updating system, when a subscriber is not present in a communication network areas to which location may be updated and is present in a communication network area to which location may not be updated, the call is abandoned.

To prevent the above-explained invalid call, detaching method may be introduced. In this method, when the subscriber terminal unit goes out of the service area of the network or when the unit is turned off, the absence of the unit is informed to a home location register. In this method, when the intensity of electric field becomes weaker than a predetermined value, detaching operation is performed and when the intensity of electric field become stronger than the predetermined value, attaching operation is performed. A subscriber terminal unit that has entered in a low or high intensity area does not always stay in the area. Thus, when the subscriber terminal unit is present at the boundary of the low intensity area and the high intensity area, the subscriber terminal unit repeats the detaching operation and the attaching operation. Consequently, when the detaching method is used, the number of signals that are transmitted between subscriber terminal units and the mobile communication network increases, thereby congesting the communication channels of the network.

In a conventional location updating system, while the location of each subscriber terminal unit is updated among mobile communication networks, it is not updated among networks including wired communication networks. Thus, there is a case that even if there is a wired telephone is present in the subscriber's neighbor, a call in process to the subscriber is performed through a mobile communication network. To prevent this problem, each subscriber have to inform the telephone number of the wired telephone to people who may call the subscriber. Thus, each subscriber has to spend a lot of time and money.

In addition, in a conventional location updating system, when the service area becomes wide with the introduction of a roaming service or the like or when the service area is subdivided so as to improve the efficiency of frequency utilization, whenever the location registered area of each terminal unit varies, the location thereof is updated. Thus, the number of signals that are transmitted between each subscriber terminal unit and the mobile communication network increases, thereby congesting the communication channels of the network.

Moreover, in a conventional location tracking system, while each subscriber is traveling, accurate tracking information cannot be obtained. Thus, tracking information sometimes does not match the place where each subscriber is present. In this case, the response for a call in is not obtained. In other words, there are wasteful call ins.

Furthermore, in a conventional location tracking system, there is a service that allows each subscriber to change tracking information. Subscribers who frequently travel and change their schedules frequently change tracking information. Since tracking information of such subscribers has much changed information, the number of signals that are transmitted between each subscriber terminal and the mobile communication network increases, thereby congesting the communication channels of the network.

SUMMARY OF THE INVENTION

An object of the present invention is to provide a mobility management system in a personal communication system. The mobility management system comprises a plurality of communication means including wired networks and mobile communication networks, wherein a personal communication can be established through a wired network even in a place where a radio wave does not reach and the most inexpensive communication means is selected in a place where a plurality communication means can be used.

According to the present invention, there is provided a mobility management system in a personal communication system having a first home database for managing location registration information of a subscriber and said subscriber's personal information so as to control the connection of a call in by tracking the location of said subscriber corresponding to said location registration information which comprises: a plurality of communication networks for receiving a location registration update request from a subscriber terminal unit and sending said location registration update request to said first home database, wherein said location registration update request represents a change of said location registration information due to power-on of said subscriber terminal unit used by said subscriber, traveling of said subscriber terminal unit, or the use of another terminal unit by said subscriber, wherein said location registration update request comprises: (a) location registered network/means information comprising location registered communication network information which represents one of said plurality of communication networks with which said subscriber terminal is registered and terminal type information of said subscriber terminal unit ; (b) call in address information comprising a telephone number used for providing a service to said subscriber terminal unit in a relevant local network; (c) order designation information for designating the priority of reference information that the first home database refers to so as to track the location of said subscriber terminal unit; and (d) tracking control information for designating a tracking method performed based on said location registered network/means information and said call in address information; and wherein said first home database comprises: a mobility managing portion for managing a plurality of tracking information blocks and time information as mobility management information, for updating said priority data and internal information of each of said tracking information blocks based on said location registered network/means information, said call in address information, said order designation information, and said tracking control information included in the received location registration update request, for updating said mobility management information upon the reception of the mobility management information change request including information for changing said mobility management information generated corresponding to the schedule of said subscriber, said mobility management information change request being input by said subscriber and sent from said subscriber terminal unit through said communication networks, and for controlling the call in by tracking the location of said subscriber terminal unit corresponding to the information of said tracking information blocks upon occurrence of a call to said subscriber, each of said tracking information blocks including said location registered network/means information, said call in address information, said order designation information, and said tracking control information for each subscriber terminal unit, each of said tracking information blocks having the priority data referenced when the location of said subscriber terminal unit is tracked, and the time information representing a time zone in which said subscriber uses said subscriber terminal unit; and a call out controlling portion for controlling the connection of a call in corresponding to said mobility management information.

According to the present invention, there is provided a mobility management system, wherein at least one of said communication networks is a wired telephone network which receives said mobility management information change request in the form of a DTMF signal from a telephone set and transfers said mobility management information change request to said first home database, and wherein the first home database comprises: means for converting said mobility management information change request in the form of said DTMF signal into digital message information.

According to the present invention, there is provided a mobility management system, wherein the telephone set is a cordless parent/child telephone set, a parent unit thereof detects whether or not a child unit thereof is present in a service area thereof and sends said location registration update request for said child unit to said first home database.

According to the present invention, there is provided a mobility management system, wherein said wired telephone network receives said location registration update request for said child unit of said cordless parent/child telephone set from said parent unit thereof in the form of said DTMF signal and transfers said location registration update request to said first home database, and wherein said first home database comprises: means for converting said location registration update request in the form of said DTMF signal into digital message information.

According to the present invention, there is provided a mobility management system, wherein each of said communication networks comprises a second home database for managing said tracking information block corresponding to the respective local network which is one of said tracking information blocks in said mobility management information managed by said first home database, updating the relevant tracking information block upon the reception of said local registration update request, and controlling the call to said subscriber in the relevant communication network by tracking the location of said subscriber terminal unit corresponding to information of said tracking information block upon occurrence of a call in to said subscriber in the relevant communication network.

According to the present invention, there is provided a mobility management system in a personal communication system having a first home database for managing a location registration information for a subscriber and subscriber's personal information so as to control the connection of a call in by tracking the location of said subscriber corresponding to said location registration information and said subscriber's personal information, which comprises: a low speed mobile communication network, connected to a first subscriber terminal unit which is a low speed mobile communication terminal unit equivalent to a telephone terminal in a simple portable telephone system, for managing first location registration information of a subscriber who uses said first subscriber terminal unit, receiving a first location registration update request representing a change of said first location registration information due to power-on of said first subscriber terminal unit or traveling of the first subscriber terminal unit from said first subscriber terminal unit, updating said first location registration information, and transferring said first location registration update request to said first home database; a high speed mobile communication network, connected to a second subscriber terminal unit which is a high speed mobile communication terminal unit equivalent to a telephone terminal unit in a portable telephone system, for managing second location registration information of a subscriber who uses said second subscriber terminal unit, receiving a second location registration update request that represents a change of the second location registration information due to power-on or traveling of said second subscriber terminal unit from said second subscriber terminal unit, updating said second location registration information, and transferring said second location registration update request to the first home database; and a wired telephone network, connected to a third subscriber terminal unit which is a telephone set or a facsimile machine, for managing third location registration information of a subscriber who uses said third subscriber terminal unit, receiving a third location registration update request that represents that said subscriber uses said third subscriber terminal unit from said third subscriber terminal, updating said third location registration information, and transferring said third location registration update request to said first home database, wherein each of said first location registration update request, said second location registration update request, and said third location registration update request comprises: (a) location registered network/means information comprising location registered network information representing a network with which the location of the relevant subscriber terminal unit is registered and terminal unit type information of said subscriber terminal unit; (b) call in address information comprising a number that is routing information used to provide a service to said subscriber terminal unit in the relevant local network; (c) order designation information for designating the priority of reference to a plurality of pieces of reference information with which said first home database tracks the location of said subscriber; and (d) tracking control information for designating a tracking method which is performed based on the location registered network/means information and the call in address information, and wherein the first home database comprises: a mobility managing portion for managing a plurality of tracking information blocks and time information as mobility management information, each of said tracking information blocks comprising said location registered network/means information, said call in address information, said order designation information, and said tracking control information for each subscriber terminal unit, each of said tracking information blocks having priority data referenced when the location of said subscriber terminal units are tracked, each of said tracking information being referenced according to said priority while the location of subscriber terminal units are tacked, the time information representing a time zone in which said subscriber uses said subscriber terminal unit; for updating the priority data and internal information of each of said tracking information blocks corresponding to said location registered network/means information, said call in address information, said order designation information, and said tracking control information included in the first, second, and third received location registration update requests; for updating said mobility management information upon the reception of said mobility management information change request comprising information for changing said mobility management information generated corresponding to a schedule of said subscriber, said mobility management information change request being input by said subscriber and sent from said first, second, or third subscriber terminal units through said low speed mobile communication network, said high speed mobile communication network, or said wired telephone network, respectively; for tracking the location of the subscriber terminal unit corresponding to the tracking information blocks upon occurrence of a call in to the subscriber, and for controlling the call in to the subscriber; a low speed mobile communication network interface portion, having an interface circuit connecting said low speed mobile communication network to said mobility managing portion, for transferring said first location registration update request received from said low speed mobile communication network to said mobility managing portion; a high speed mobile communication network interface portion, having an interface circuit connecting said high speed mobile communication network to said mobility managing portion, for transferring said second location registration update request received from said high speed mobile communication network to said mobility managing portion; a wired telephone network interface portion, having an interface circuit connecting said wired telephone network to said mobility managing portion, for transferring said third location registration update request received from said wired telephone network to said mobility managing portion; and a call out controlling portion for controlling the connection of a call in corresponding to said mobility management information.

According to the present invention, there is provided a mobility management system, wherein said wired telephone network receives said mobility management information change request in the form of a DTMF signal from the telephone set and transfers said mobility management information change request to said first home database, and wherein said first home database has means for converting said mobility management information change request into digital message information.

According to the present invention, there is provided a mobility management system, wherein said telephone set is a cordless parent/child telephone set, a parent unit thereof detects whether or not a child unit thereof is present in a service area thereof and sends a location registration update request for said child unit to said first home database.

According to the present invention, there is provided a mobility management system, wherein said wired telephone network interface portion of said first home database receives a location registration update request of said child unit of said cordless parent/child telephone set in the form of the DTMF signal, converts the location registration update request into the message information compatible with said first location registration update request and said second location registration update request, and sends the resultant information to said mobility managing portion.

According to the present invention, there is provided a mobility management system, wherein each of said low speed mobile communication network, said high speed mobile communication network, and said wired telephone network has a second home database for managing a tracking information block corresponding to the relevant local network which is one of said tracking information blocks in the mobility management information managed by said first home database, updating the relevant tracking information block in the reception of the first, second, and third location registration update request, respectively, and controlling call in by tracking said location of the subscriber terminal unit corresponding to information of said tracking information block upon occurrence of a terminating call to said subscriber in the relevant local network.

According to the present invention, there is provided a mobility management system, wherein the subscriber's personal information comprises one subscriber number, one subscriber name, and one subscriber certification number.

According to the present invention, there is provided a mobility management system, wherein the subscriber's personal information is one of numbers which constitute routing information assigned to a plurality of terminal units used by said subscriber, respectively.

According to the present invention, there is provided a mobility management system, wherein said mobility managing portion determines whether or not a tracking information block for said subscriber terminal that has sent said location registration update request is registered in said mobility managing information when said mobility managing portion receives said location registration update request from said subscriber, newly generates a tracking information block corresponding to the information included in said received location registration update request, registers said generated tracking information block with said mobility management information in case that said tracking information block is not registered, and updates the registered tracking information block corresponding to the information contained in said received location registration update request in case that said tracking information block is registered in said mobility management information.

According to the present invention, there is provided a mobility management system, wherein each of the tracking information blocks updates the information corresponding to said order designation information and said tracking control information contained in said mobility management information in accordance with said order designation information and said tracking control information in said location registration update request issued by said subscriber, and wherein if said location registration update request issued by said subscriber does not includes said order designation information and said tracking control information, each of the tracking information blocks does not update the information corresponding to said order designation information and said tracking control information.

According to the present invention, there is provided a mobility management system, wherein when said tracking control information of said location registration update request issued by said subscriber or said order designation information in said mobility management information designates a communication network or a communication means as a non-tracking object, said mobility managing portion track the locations of said subscriber terminal units excluding said designated communication network or said communication means.

According to the present invention, there is provided a mobility management system, wherein said mobility managing portion successively references said tracking information blocks in accordance with the priority so as to track the location of said subscriber terminal units; wherein when communication means on the call in side is changed, said mobility managing portion informs a subscriber on the call out side of changed communication means on the call in side with voice or character string and said subscriber terminal unit on call out side which is informed of the change of the communication means on call in side performs checking to determine whether or not a communication between the terminal unit on the call out side and the call in side through said changed communication means on the call in side can be established; wherein if it is determined that the communication cannot be established, said subscriber terminal unit in call out side informs said first home database of the determined result and terminates the location tracking operation; wherein if it is not determined whether or not the communication can be established, said subscriber terminal unit in call out side informs said subscriber in call out side of the result and said mobility management portion tracks the location of said subscriber terminal unit in call in side corresponding to information entered by said subscriber in call out side through a keypad; and wherein if it is determined that the communication can be made, said subscriber terminal unit in call out side changes the communication means and said mobility managing portion tracks the location of said subscriber terminal unit in call in side.

According to the present invention, there is provided a mobility management system, wherein the mobility management information change information comprises: changed information of said location registered network, said terminal type information of said subscriber terminal unit, said call in address information and time information concerning the time when said subscriber uses said subscriber terminal unit in said mobility management information; tracking order designation information; and tracking control information.

According to the present invention, there is provided a mobility management system, wherein said first home database manages the routing information of said second home database and routes a terminating call for said subscriber to said second home database upon occurrence of an inquiry of the call in to said subscriber, and wherein said second home database extracts a call number of said subscriber from said relevant tracking information block so as to control said call in.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a schematic diagram showing the structure of a mobility management system in a personal communication system according to a first embodiment of the present invention;

FIG. 2 is a schematic diagram showing the structure of a home database 7;

FIG. 3 is a schematic diagram for explaining an example of mobility management information managed by the home database 7;

FIG. 4 is a schematic diagram for explaining an example of the format of a location registration update request signal received by a mobility managing portion 17;

FIG. 9 is a schematic diagram showing the structure of a parent unit 25 of a cordless telephone set of which the mobility of child unit 27 is managed;

FIG. 10 is a schematic diagram showing the structure of a mobility management system in a personal communication system according to a second embodiment of the present invention;

FIGS. 11A and 11B are schematic diagrams showing the structures of distributed home databases 38a, 38b, and 38c according to the present invention;

FIG. 12 is a schematic diagram for explaining an example of mobility management information of a subscriber managed by center home database 37;

FIG. 13 is a flow chart showing the operation of mobility managing portion 48 of a distributed home database;

DESCRIPTION OF PREFERRED EMBODIMENTS

Figure 5:
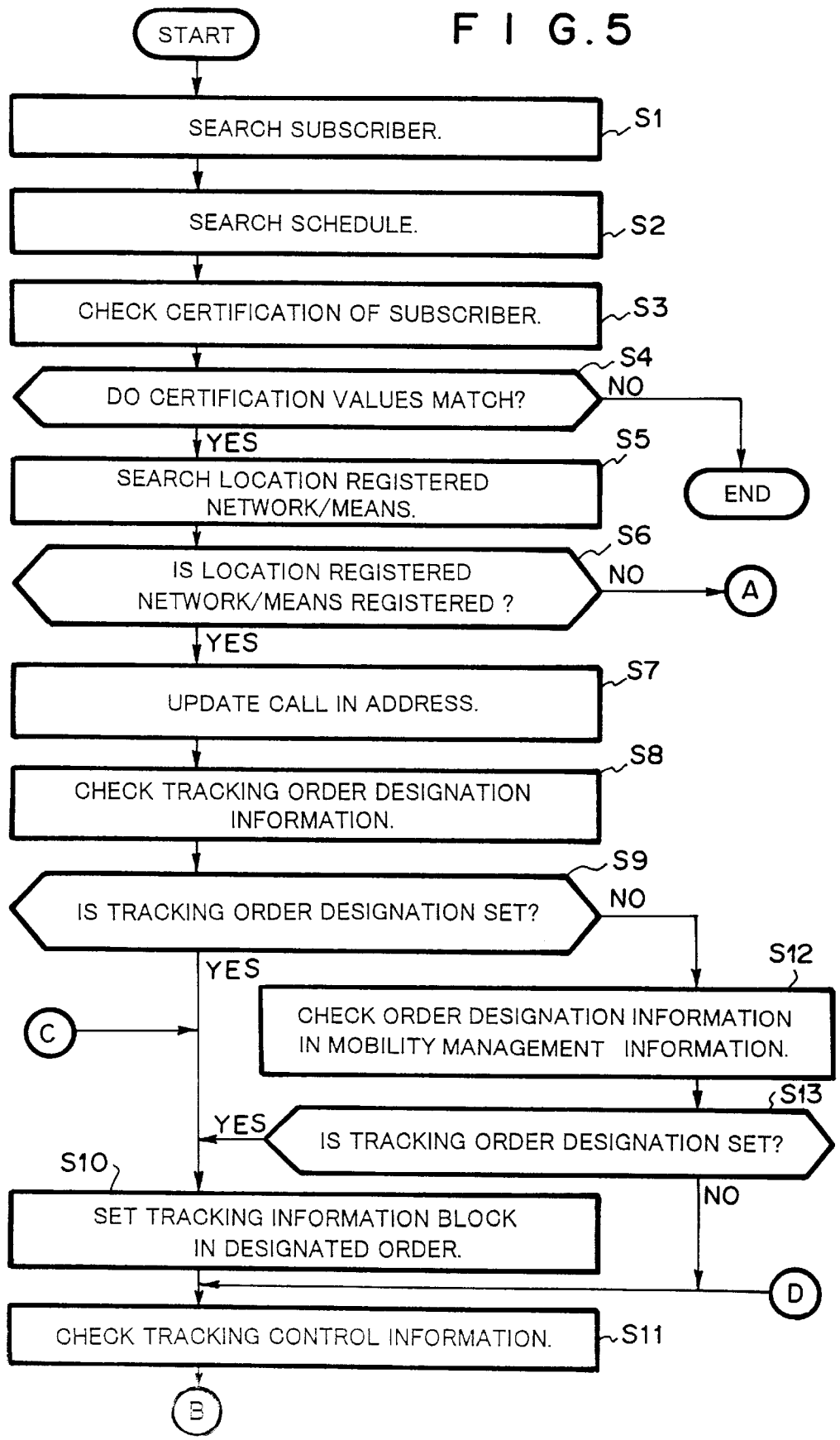
FIG. 5 is a flow chart showing the operation of the mobility managing portion 17 in the case that the location registration update request is received from a subscriber due to an update of the location of the subscriber.

FIG. 1 is a schematic diagram showing the structure of a mobility management system in a personal communication system according to a first embodiment of the present invention. The mobility management system in the personal communication system shown in FIG. 1 comprises wired telephone network 4, low speed mobile communication network 5, high speed mobile communication network 6, and home database 7. Wired telephone network 4 accommodates telephone set 1, telephone set 2, and facsimile machine 3. Telephone set 1 is used in the home of a subscriber. Telephone set 2 is used in the company of the subscriber. Facsimile machine 3 is used in the company of the subscriber. Wired telephone network 4 manages an updating operation of a registered location of a terminal unit corresponding to a location registration update request signal that is sent from the terminal unit to inform that the subscriber uses the terminal unit. Low speed mobile communication network 5 is connected to low speed mobile communication subscriber terminal unit 10 that is equivalent to a telephone set in a simple portable telephone system (PHS: Personal Handy-phone System). Low speed mobile communication network 5 has location register 8 that manages an updating operation of a registered location of terminal unit 10 corresponding to a location registration update request signal received from subscriber terminal unit 10 upon the power-on the subscriber terminal unit 10, the traveling of subscriber terminal unit 10 between location registered areas, or the use of another subscriber terminal unit. The high speed mobile communication network 6 is connected to a high speed mobile communication subscriber terminal unit 11 that is equivalent to a telephone set in a portable telephone system. High speed mobile communication network 6 has location register 9 that manages an updating operation of a registered location of terminal unit 11 corresponding to a location registration update request signal received from subscriber terminal unit 11 upon the power-on of subscriber terminal unit 11, the traveling of subscriber terminal unit 11 between location registered areas, or the use of another subscriber terminal unit. Home database 7 is connected to wired telephone network 4, low speed mobile communication network 5, and high speed mobile communication network 6. Home database 7 manages the mobility of each subscriber.

FIG. 2 is a schematic diagram showing the structure of home database 7. Referring to FIG. 2, home database 7 comprises wired telephone network interface portion 14, low speed, high speed mobile communication network interface portion 16, mobility managing portion 17, and call out controlling portion 18. Wired telephone network interface portion 14 is connected to wired telephone network 7. Low speed mobile communication network interface portion 15 is connected to low speed mobile communication network 5. High speed mobile communication network interface portion 16 is connected to high speed mobile communication network 6. Mobility managing portion 17 manages mobility management information and subscriber's personal information. Mobility management information relates to each subscriber and each subscriber terminal unit and includes information processed in location register 8 and 9 and information processed in the location tracking operation. The call out controlling portion 18 controls the connection of a call out. Wired telephone network interface portion 14 has a push button dial (dual tone multi-frequency: DTMF) receiver. Wired telephone network interface portion 14 receives a location registration update request signal in the form of the DTMF signal which is sent from a terminal unit in wired telephone network 4 so as to update the currently registered location of the terminal unit. Moreover, wired telephone network interface portion 14 receives a mobility management information change request signal from terminal unit in wired telephone network 4 in the case that mobility management information (such as subscriber terminal type information, call in address information, and time zone information in which each subscriber terminal unit is used) is changed due to a change of the schedule of each subscriber. Upon receiving any of these signals, wired telephone network interface 14 converts the received signal into message information compatible with low speed mobile communication network interface portion 15 and high speed mobile communication network interface portion 16 and supplies the resultant information to mobility managing portion 17. The mobility management information change request signal includes changed information of a location registered, subscriber terminal unit type information, call in address information of mobility management information, time zone information of each subscriber terminal unit used by each subscriber, tracking order designation information, and tracking control information.

FIG. 3 is a schematic diagram showing an example of mobility management information and subscriber's personal information regarding to each subscriber and each terminal unit managed by home database 7. In FIG. 3, a subscriber number "123456789" is assigned to a subscriber A when the subscriber subscribes to the communication system. A subscriber certification value is a numeric value used to check whether or not the user of a subscriber terminal unit is the true subscriber when the subscriber registers the location of the subscriber terminal unit. When the subscriber subscribes to the communication system, the subscriber certification value is assigned to the subscriber. The subscriber certification value is managed as mobility management information by home database 7. When each subscriber registers the location of the subscriber terminal unit, mobility managing portion 17 of home database 7 compares a particular value calculated with the subscriber certification number and a subscriber certification key assigned to the subscriber with the subscriber certification value managed by home database 7 so as to check the user of the terminal unit. When they match, mobility managing portion 17 determines that the user of the terminal unit that has sent the location registration update request is the true subscriber. The subscriber number, the subscriber name, the subscriber certification value, and so forth are subscriber's personal information. The order designation information is information for designating the tracking order. "Individual designation" shown in FIG. 3 represents that order designation information is individually designated for individual terminal units in a plurality of location registered networks. Tracking control information represents how to deal with the case that the subscriber A is absent or a relevant terminal unit does not respond. This information is designated for each location registered network. When the subscriber A is absent, the tracking control information is designated as either "next tracking upon absence" or "next tracking upon no response". Information in a "time—time" field represents a schedule which specifies a terminal unit the subscriber A use for each time zone.

A tracking information block shown in FIGS. 3 represents mobility management information regarding to the subscriber A and each terminal unit used by the subscriber A. The tracking information block includes a location registered network/means, a call in address, order designation information, and tracking control information. These pieces of information compose a tracking information block. Each tracking information block is registered by an operator of the communication system when each subscriber starts to subscribe to the communication system. In addition, the tracking information block is registered to the home database 7 corresponding to location registration update request information issued by each subscriber when the location registration update request is issued if a location registered network/means has not been registered. Tracking information blocks shown in FIG. 3 are generated for individual terminal units used by the subscriber A, namely the subscriber terminal unit 10 in the low speed mobile communication network, the telephone set 1 in the wired telephone network 4, the subscriber terminal unit 11 in the high speed mobile communication network, and the facsimile 3 in the wired telephone network 4. The tracking information blocks are registered in the home database 7. For example, a tracking information block—(1) is composed of a location registered network/means—(1), a call in address—(1), order designation information—(1), and tracking control information—(1). Suffix "(1)" in these pieces of information represents that individual information belong to the tracking information block—(1). This applies to a tracking information block (2) to a tracking information block (4).

The location registered network/means of each tracking information block represents a communication network in which the terminal unit of the subscriber A has been registered and a terminal unit type thereof. In other words, one of the telephone set in the wired telephone network, the facsimile in the wired telephone network, the low speed mobile communication subscriber terminal unit in the low speed mobile communication network, and the high speed mobile communication subscriber terminal in the high speed mobile communication network is designated. A call in address represents the address of the terminal unit used by the subscriber A. As explained above, order designation information represents a tracking priority. Tracking control information represents how to deal with the case that the subscriber A is absent or the terminal unit thereof does not respond. In the home database 7 shown in FIG. 1, mobility management information shown in FIG. 3 is stored in a subscriber profile for each subscriber so as to manage the mobility of each subscriber.

FIG. 4 is a schematic diagram showing an example of the format of a location registration update request signal transmitted to mobility managing portion 17 from wired telephone network 4, low speed mobile communication network 5, and high speed mobile communication network 6 through wired telephone network interface portion 14, low speed mobile communication network interface portion 15, and high speed mobile communication network interface portion 16 in the home database 7, respectively. When each subscriber starts to subscribe to the communication system the subscriber certification number contained in the location registration update request signal is assigned to the subscriber as well as the subscriber number.

In the following explanation, in the mobility management system in the personal communication system shown in FIG. 1, it is assumed that subscriber A shown in FIG. 3 has registered telephone set 1 used in the home of the subscriber, telephone set 2 used in the company of the subscriber, and facsimile machine 3 used in the company of the subscriber for wired telephone network 4. In addition, in FIG. 1, it is assumed that subscriber A shown in FIG. 3 has registered subscriber terminal unit 10 and subscriber terminal unit 11 for low speed mobile communication network 5 and high speed mobile communication network 6, respectively. Low speed mobile communication subscriber terminal unit 10 and high speed mobile communication subscriber terminal unit 11 may be combined in a single terminal unit that has a dual function. However, in this example, it is assumed that low speed mobile communication subscriber terminal unit 10 and high speed mobile communication subscriber terminal unit 11 are independent terminal units.

Next, the location updating operation and the location tracking operation in the mobility management system in the personal communication system shown in FIG. 1 will be explained.

First, the location updating operation will be explained. Now we assume that mobility management information of subscriber A stored and registered in home database 7 is as shown in FIG. 3. When subscriber A will go home at 17:30, the subscriber turns on the power of subscriber terminal unit 11 for high speed mobile communication network 6, inserts his or her own subscriber card into subscriber terminal unit 11, and enters his or her subscriber certification number. Subscriber terminal unit 11 checks the certification of the subscriber with the entered subscriber certification number. When subscriber terminal unit 11 has determined that the user of subscriber terminal unit 11 is the true subscriber, subscriber terminal unit 11 determines that the operation of the subscriber is the request for starting location registration and sends a location registration update request of the subscriber to high speed mobile communication network 6. Upon receiving the location registration update request, high speed mobile communication network 6 updates location register 9 and transfers the location registration update request to home database 7. The location registration update request is received by high speed mobile communication network interface portion 16 of home database 7 shown in FIG. 2. High speed mobile communication network interface portion 16 transfers the location registration update request to mobility managing portion 17. The information shown in FIG. 4 is the information contained in the location registration update request in this case. Likewise, when a location registration update request is issued from another terminal unit, the location registration update request is transferred to mobility managing portion 17 through the relevant network corresponding to the terminal unit. However, a location registration update request issued from wired telephone network 4 takes the form of a DTMF signal. In this case, the DTMF receiver in wired telephone network interface portion 14 receives the DTMF signal, converts the signal into message information including the information as shown in FIG. 4, and sends the message information to mobility managing portion 17.

Figure 6:
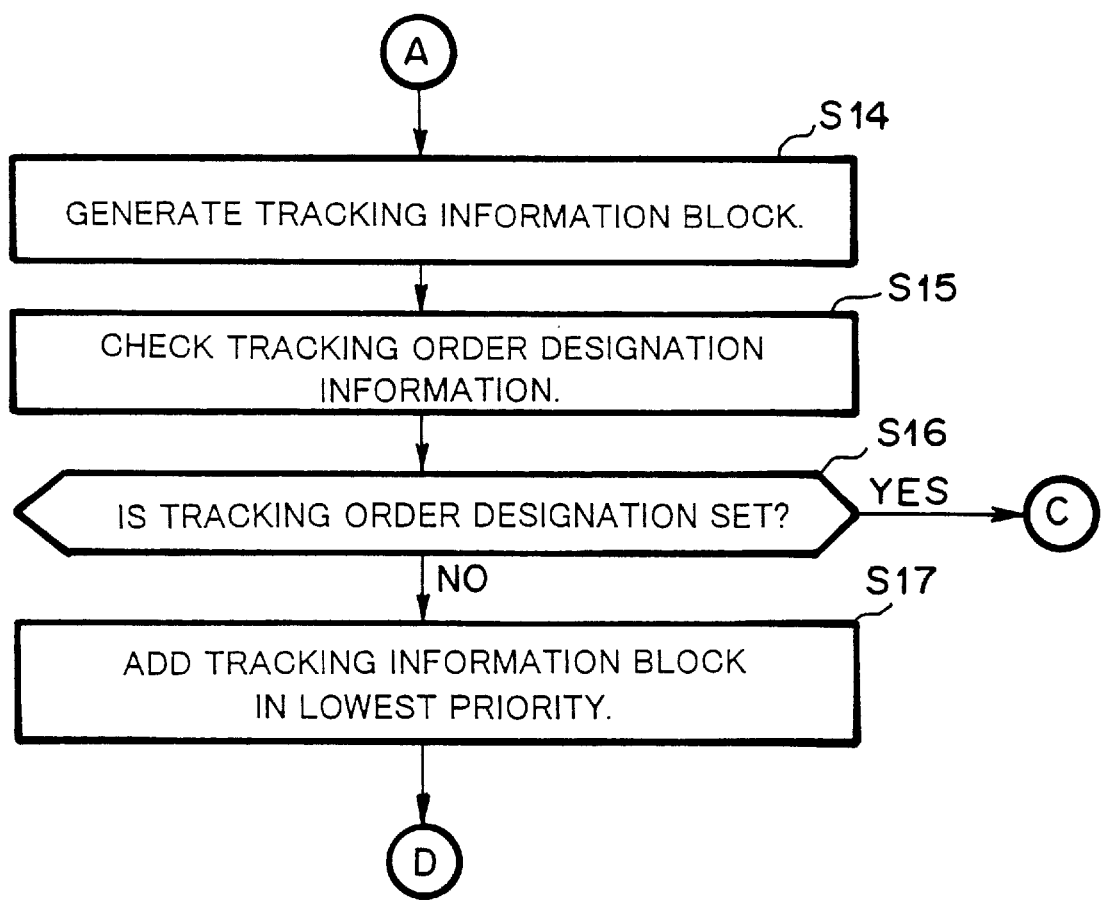
FIG. 6 is a flow chart showing a second part of FIG. 5.
Figure 7:
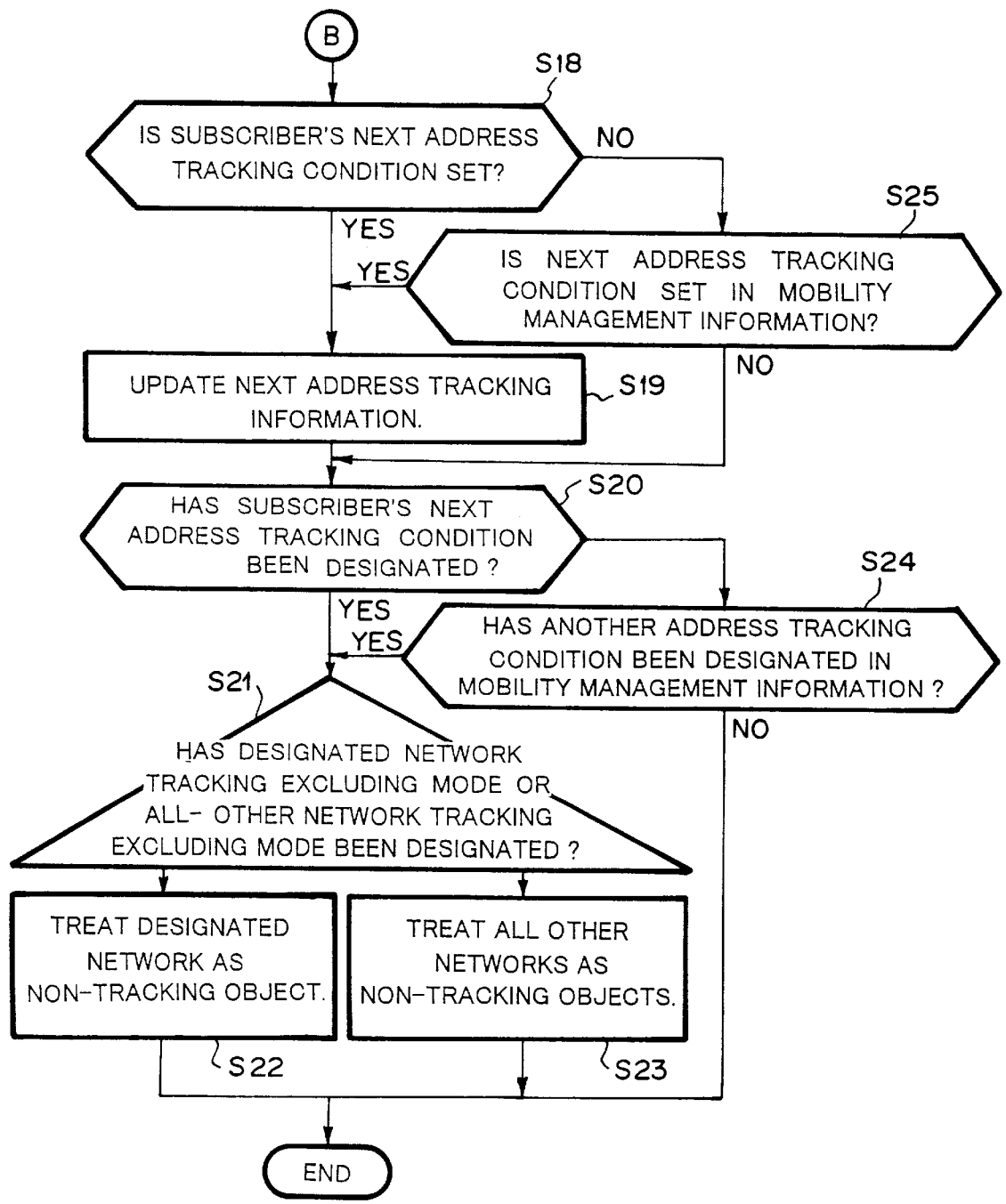
FIG. 7 is a flow chart showing a third part of FIG. 5.

Next, with reference to FIG. 5, the operation of mobility managing portion 17 of home database 7 will be explained. FIG. is a flow chart showing the operation of mobility managing portion 17 in the case that mobility managing portion 17 receives a location registration update request from a subscriber. FIG. 5 shows the first part (from steps 1 to 11) of the flow chart. FIG. 6 shows the second part (from steps 14 to 17) of the flow chart. FIG. 7 shows the third part (from steps 18 to 25) of the flow chart.

The mobility managing portion 17 that has received the information (shown in FIG. 4) contained in the location registration update request signal searches subscriber A with the subscriber number (at step S1 shown in FIG. 5) and searches the schedule of subscriber A corresponding to the received time of the information (at step S2) so as to obtain the mobility management information shown in FIG. 3. Next, mobility managing portion 17 calculates the subscriber certification value with the subscriber certification number and the certification key of subscriber A so as to check the certification of the subscriber A (at step S3).

Next, mobility managing portion 17 determines whether or not the subscriber certification value obtained by the aforementioned calculation with the subscriber certification value in the mobility management information (at step S4). When they do not match, in other words the person who has issued the location registration update request is not the registered subscriber, mobility managing portion 17 terminates the mobility management information updating operation. When the certification values match, mobility managing portion 17 determines whether or not the location registered network/means that issued the location registration update request is registered. In the case that the mobility management information and the subscriber's personal information is as shown in FIG. 3, the mobility managing portion 17 searches the high speed mobile communication network in the field of location registered network/means so as to determine whether or not a tracking information block for the subscriber terminal unit in the high speed mobile communication network is registered (at step S5). If mobility managing portion 17 finds the location registered network/means already registered, mobility managing portion 17 determines that a tracking information block is registered. That is, tracking information block (3) is a tracking information block for the high speed mobile communication network and has been registered. Thus, at step S5, mobility managing portion 17 finds the tracking information block (3). Consequently, mobility managing portion 17 determines that the tracking information block for the subscriber terminal unit in the high speed mobile communication network is registered (at step S6). If it is determined that the tracking information block is registered at step S6, mobility managing portion 17 updates the call in address of the tracking information block, which is call in address of the tracking information block (3) in this case, with call in address information of the mobility information included in the location registration update request signal (at step S7). The reason why updating the call in address is that if subscriber A performs a personal communication with personal mobility, the call in address maybe changed. Next, mobility managing portion 17 determines whether or not a tracking order designation is set in the order designation information of the location registration update request issued by subscriber A (at step S8) Mobility managing portion 17 determines whether or not a tracking order designation is set corresponding to the determined result at step S8 (at step S9). If a tracking order designation is set in the order designation information of the location registration update request, mobility managing portion 17 designates the block number of the tracking information block corresponding to the designated priority number (at step S10) and checks the tracking control information shown in FIG. 3 (at step S11). At steps S8 to S11, in the case of the location registration update request signal shown in FIG. 4, since "no priority change" is designated to priority designated information—N, block number (3) of tracking information block—(3) remains unchanged. If it is determined that a tracking order designation is not set in the order designation information of the location registration update request issued by the subscriber A at step S9, mobility managing portion 17 determines whether or not a tracking order designation is set as order designation information in the mobility management information (at step S12). Mobility managing portion 17 determines whether or not a tracking order designation is set corresponding to the result of check at step S12 (at step S13). If a tracking order designation is set, the flow goes to step S10. At step S10, mobility managing portion 17 designates the tracking information block number corresponding to the designated priority. If it is determined that a tracking order designation is not set at step S13, the flow goes to step S11. At step S11, mobility managing portion 17 checks the tracking control information.

If it is determined that the location registered network/means is not registered at step S6, mobility managing portion 17 generates a tracking information block corresponding to the location registration update request issued by the subscriber (at step S14 shown in FIG. 16). Mobility managing portion 17 checks whether or not tracking order designation is set in the order designation information included in the location registration update request information issued by the subscriber (at step S15). Mobility managing portion 17 determines whether or not a tracking order designation is set corresponding to the determined result at step S15 (at step S16). If it is determined that a tracking order designation is not set, mobility managing portion 17 adds a tracking information block as the lowest priority tracking information block to the mobility management information (at step S17). If it is determined that a tracking order designation is set at step S16, the flow goes to step S10. At step S10, mobility managing portion 17 designates a tracking information block number to the tracking information block corresponding to the designated tracking order.

Comparing the examples shown in FIGS. 3 and 4, although a tracking order designation is not set in the order designation information in the location registration update request shown in FIG. 4 which is transmitted from the subscriber, the first priority is set in the order designation information in tracking information block (3). Since a block number represents a designated tracking order, the block number (3) of the tracking information block (3) is changed to (1) to set the block as the tracking information block (3) corresponding to the designated tracking order. Thus, the tracking information blocks (1) and (2) that have been designated in the mobility management information are altered to the tracking information blocks (2) and (3), respectively. After checking out the tracking control information at step S11, mobility managing portion 17 determines whether or not a subscriber's next address tracking condition that represents a switching condition to a subscriber terminal unit address that should be tracked successively is set in tracking control information in the location registration update request information issued by the subscriber (at step S18 shown in FIG. 7). If a subscriber's next address tracking condition is set in the tracking control information, mobility managing portion 17 updates the tracking control information of tracking information block (1) (at step S19). If a subscriber's next address tracking information is not set in the tracking control information as the determined result at step S18, mobility managing portion 17 determines whether or not a subscriber's next address tracking condition is set in the tracking control information of the mobility management information (at step S25). If the next address tracking condition is set in the tracking control information, the flow goes to step S19. At step S19, mobility managing portion 17 updates next address tracking information. If the next address tracking condition is not set in the tracking control information, the flow goes to step S20. At step S20, the mobility managing portion 17 determines whether or not another address tracking condition is set in the tracking control information issued by the subscriber. In the example shown in FIG. 3, since the tracking control information in the mobility management information is "next tracking upon absence", mobility managing portion 17 just designates "next tracking upon absence" at it has been. Next, mobility managing portion 17 determines whether or not the tracking control information issued by the subscriber is set to be another address tracking condition for designating a tracking condition of a tracking information block other than that which corresponds to the location registered network/means (at step S20). If the tracking control information issued by the subscriber is set to be another address tracking condition, mobility managing portion 17 determines whether another address tracking condition is a designated network excluding mode for treating a designated network as a non-tracking object or an all-other network excluding mode for treating all other networks as non-tracking objects (at step S21). If another address tracking condition is the designated network excluding mode, mobility managing portion 17 treats the designated network as a non-tracking object (at step S22) and terminates the updating process. If another address tracking condition is the all-other network excluding mode, mobility managing portion 17 treats all other networks as non-tracking objects (at step S23) and terminates the updating process. If the tracking control information issued by the subscriber is not another address tracking condition as the determined result at step S20, mobility managing portion 17 determines whether or not the tracking control information in the mobility management information is set to be another address tracking condition (at step S24). If the tracking control information in the mobility management information is another address tracking condition, the flow goes to step S21. At step S21, mobility managing portion 17 determines whether another address tracking condition is a designated network excluding mode for treating a designated network as a non-tracking object or an all-other network excluding mode for treating all other networks as non-tracking objects. If the tracking control information in the mobility management information is not another address tracking condition as the determined result at step S24, mobility managing portion 17 terminates the updating process. In the example shown in FIG. 4, since the second location registered network/means 02 (up to two location registered network/means can be designated) in which the facsimile machine in the wired telephone network (wired telephone network facsimile) has been designated has designated as a non-tracking object in the tracking control information—N, the mobility managing portion 17 clears "next tracking upon no response" of the tracking control information in the tracking information block of the telephone set in the wired telephone network that has become the tracking information block (3) due to the change of the priority of the tracking information block at STEP 10 so as to designate the tracking information block (4) for the facsimile machine in the wired telephone network as a non-tracking object. As another tracking control information, a designated network that has been designated as a non-tracking object may be restored to a tracking object. This operation is referred to as designated network including operation. In the above-explained example, subscriber terminal unit 11 in high speed mobile communication network 6 issues a location registration update request. Likewise, the above-explained operation applies to the cases that a location registration update request is issued from another network, that a location registration update request is issued while location registering operation is performed, and that a location registration update request is issued while registered location erasing operation is performed.

In the example shown in FIG. 3, the subscriber number, the subscriber name, and the subscriber certification value of subscriber A are set. However, if such pieces of information of subscriber A cannot be set, by using a terminal number assigned to one of a plurality of terminal units that subscriber A usually uses as a substitute for the subscriber number, subscriber A can be tracked. However, in this case, since the network side cannot determine the response of subscriber A, when a condition for tracking the next address is designated, the condition which necessitates the identification of subscriber A cannot be used. In addition, the home database may be substituted with a database for terminal units of a network that includes the terminal units with the terminal number which is used for the substitute for the subscriber number. In addition, when a subscriber number can be used and a subscriber can be identified therewith, the subscriber name can be omitted. Although the subscriber certification value must be checked when mobility management information is updated, the subscriber certification value is not required when the location register is updated by a location registration update request signal or the like because a terminal unit certification is performed in such a manner that the location register update request signal is verified to determine the terminal which sent the location register update request signal is the terminal unit which is allowed to send the location register update request signal. However, when a subscriber issues a location registration update request with a DTMF signal or the like from a wired network terminal unit, since the subscriber issues the request with the DTMF signal (in other words, the terminal unit does not control the location registration update request), for a security reason, the subscriber certification value is required.

FIG. 9 is a schematic diagram showing the structure of parent unit 25 of a cordless telephone set. Parent unit 25 is connected to wired telephone network 4 in the place of telephone set 1 shown in FIG. 1. The mobility of child unit 27 of the cordless telephone set is under mobility management.

Parent unit 25 of the cordless telephone set shown in FIG. 9 instead of telephone unit 1 shown in FIG. 1 is connected to wired telephone network 4. The mobility of child unit 27 is managed. In this structure, child unit checking portion 28 is built in parent unit 25. Child checking portion takes a part of mobility management. Child unit checking portion 28 asks call in/out controlling portion 26 for the communication state of the child unit 27. When child unit 27 is not busy, child unit checking portion 28 determines whether or not child unit 27 is present in a service area of parent unit 25 at intervals of a predetermined time period. When child unit 27 does not respond successively a predetermined number of times, child unit checking portion 28 determines that child unit 27 has left out of the service area. Thereafter, child unit checking portion 28 determines whether child unit 27 is present in the service are at intervals of a predetermined time period. When child unit 27 responds to child unit checking portion 28 or restarts to respond thereto after leaving the service area successively a predetermined number of times, child unit checking portion 28 determines that child unit 27 has come back to the service area at this point. Child unit checking portion 28 sends a location registration update request with a call in address of home database 7 to call in/out controlling portion 26. In this case, child unit checking portion 28 appends location registration start information or location registration erasing information both of which contains the subscriber number, the subscriber certification number, the subscriber in-service-area information of child unit 27 and so forth to the location registration update request. Call in/out controlling portion 26 converts location registration start information or location registration erasing information into a DTMF signal corresponding to the location registration update request and sends the DTMF signal to home database 7.

Next, the location tracking operation in the mobility managing system in the personal communication system shown in FIG. 1 will be explained. In the registration state shown in FIG. 3, when a call to subscriber A is made from one of wired telephone network 4, low speed mobile communication network 5, and high speed mobile communication network 6, the call is routed to home database 7. When a call in arises at wired telephone network 4, wired telephone network interface portion 14 receives the call in. Wired telephone network interface portion 14 sends the call in to call out controlling portion 18. Call out controlling portion 18 sends information of the call in to mobility managing portion 17 to prepare for the location tracking operation.

Figure 8:
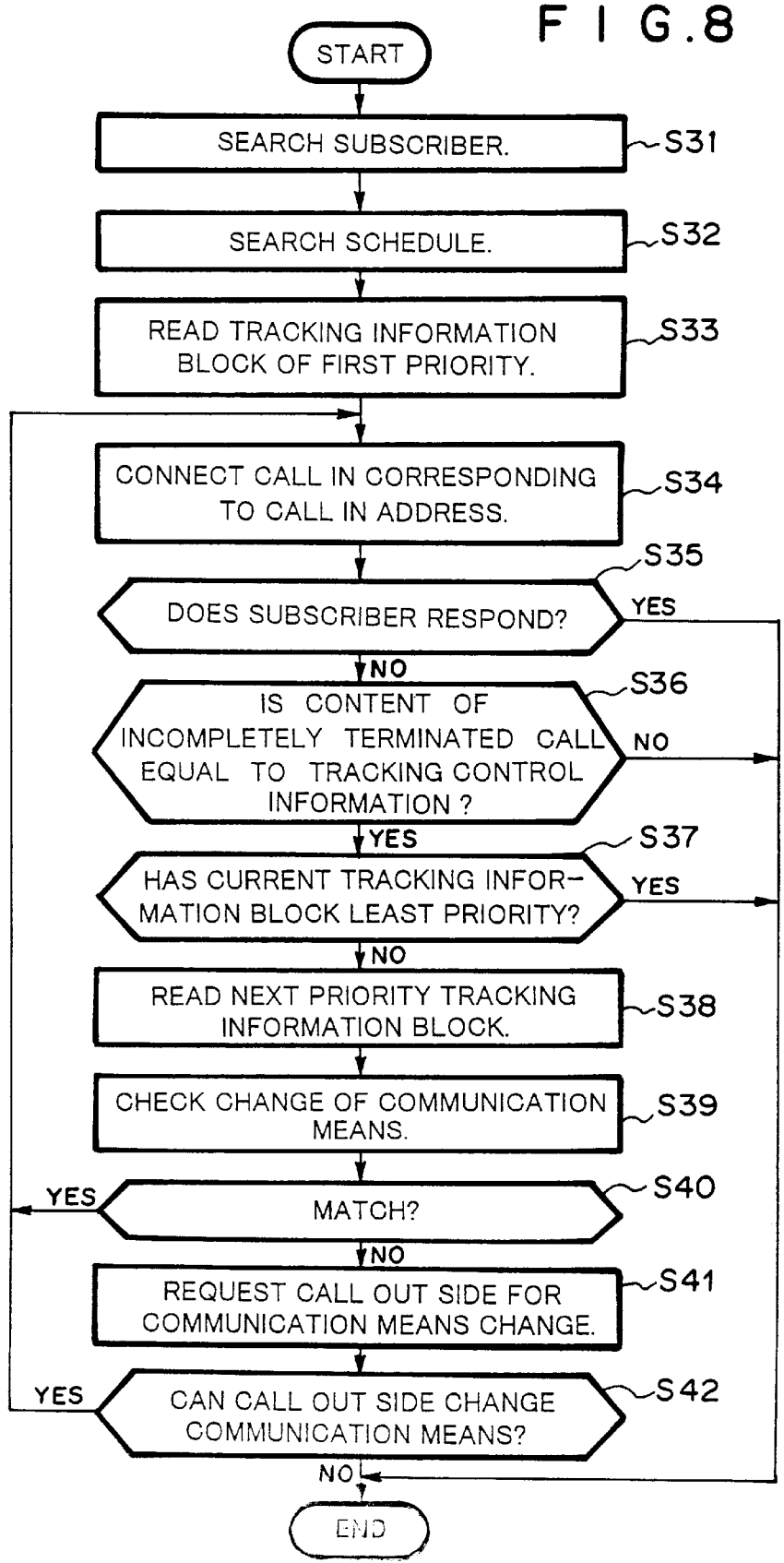
FIG. 8 is a flowchart showing the operation of the mobility managing portion 17 in the case that a call in to a subscriber is controlled by a location tracking operation.
Figure 14:
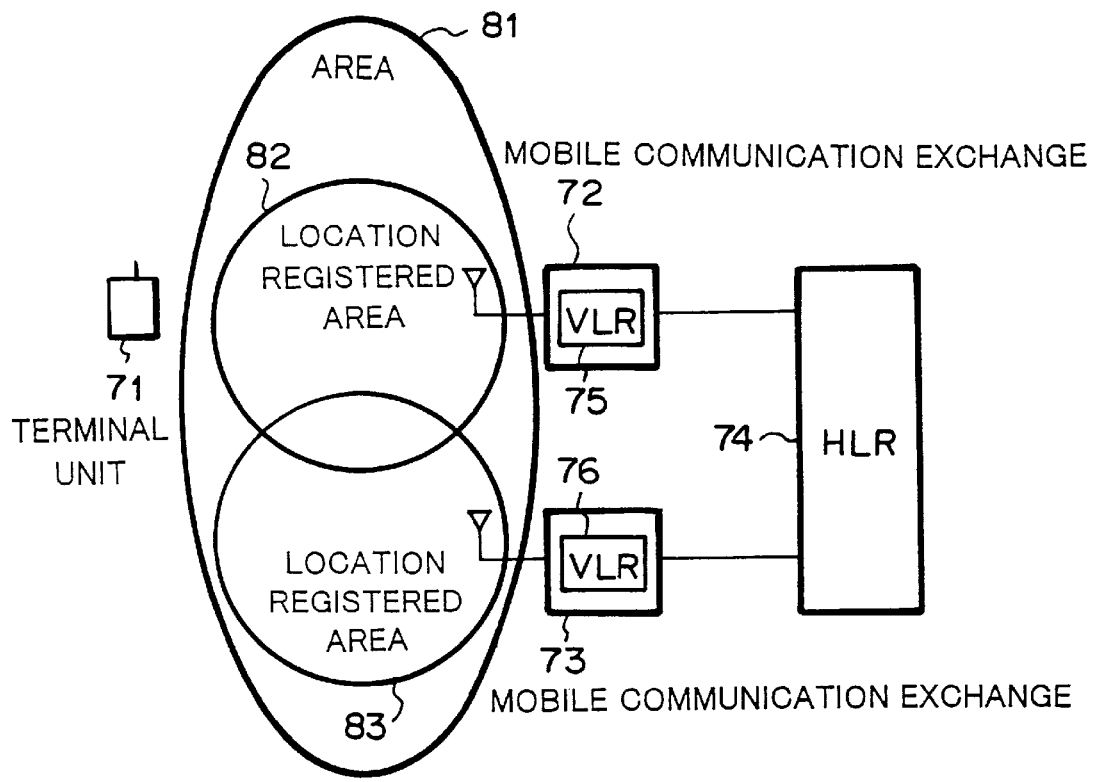
FIG. 14 is a schematic diagram for explaining a conventional location updating system in a personal communication system.
Figure 15:
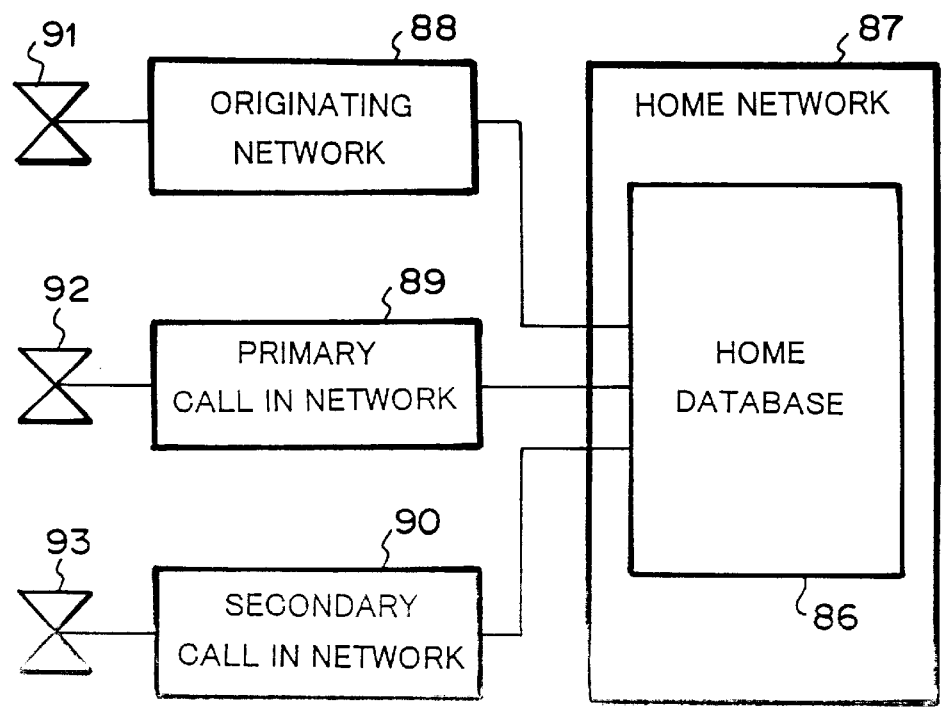
FIG. 15 is a schematic diagram for explaining a conventional location tracking system in a personal communication system.

Next, with reference to a flow chart shown in FIG. 8, the location tracking operation of mobility managing portion 17 will be explained. FIG. 8 shows the operation of mobility managing portion 17 in the case that a call in to a subscriber is controlled by a location tracking operation. Mobility managing portion 17 shown in FIG. 2 searches a particular subscriber using the information of the call in received from call out controlling portion 18 (at step S31 shown in FIG. 8) and searches the schedule of the subscriber (at step S32). Thus, mobility managing portion 17 obtains mobility management information shown in FIG. 3. Mobility managing portion 17 reads the tracking information block (1) that has the first priority tracking information among the mobility management information (at step S33). Mobility managing portion 17 sends the call in address and the subscriber number to call out controlling portion 18 so as to let call out controlling portion 18 connect the call in corresponding to the call in address that has been read from the information. Thus, call out controlling portion 18 controls the connection of the call in (at step S34). Call out controlling portion 18 informs mobility managing portion 17 of the result of the call in control to the designated subscriber which was performed using the call in address. Mobility managing portion 17 determines whether or not the subscriber responds to the call in with the result (at step S35) If the designated subscriber responds with the call in address, mobility managing portion 17 determines that the call in connection has completed and completes the location tracking process. If it is determined that the designated subscriber does not respond at step S35, mobility managing portion 17 compares the content of the call that has not been terminated with the condition of the tracking control information of the mobility management information (at step S36). If they do not match, mobility managing portion 17 terminates the location tracking operation. If they match, mobility managing portion 17 determines whether or not the current tracking information block is the least priority tracking information block (at step S37). If the current tracking information block is the least priority tracking information block, mobility managing portion 17 completes the location tracking operation. If the current tracking information block is not the least priority tracking information block, mobility managing portion 17 reads the next priority tracking information block (at step S38). At this point, since the operation for the tracking information block (1) has been completed, mobility managing portion 17 reads the tracking information block (2) as the next priority tracking information block at step S38. Next, mobility managing portion 17 checks whether the communication means designated in the location registered network/means of the tracking information block (2) matches the communication means designated in the location registered network/means of the tracking information block (1) or the communication the two means do not match due to a change of the communication means (at step S39). The mobility managing portion 17 determines whether or not the means information in the location registered network/means information matches the previous information corresponding to the result of the check at step S39 (at step S40). If it is determined that they match at step S40, the flow returns to step S34. At step S34, mobility managing portion 17 performs the next call in control. If they do not match at step S40, mobility managing portion 17 sends an inquiry message with the information of the new communication means (namely, the terminal unit type information) to the call out network so as to determine whether the call out terminal unit can communicate with the changed terminal unit (at step S41). The network on call out side sends a relevant message to the call out terminal unit. The call out terminal unit displays the occurrence of change of the communication means on call in side and the new communication means on the display and generates a signal sound calling the subscriber on call out side. If it is possible to switch the current communication means to the designated communication means, the subscriber on call out side switches the communication means and enters information to make a response informing capability of switching with the key pad. If it is not possible to switch the current communication means to the designated communication means, the subscriber on call out side disconnects the call. If the network on call out side receives the response, it transfers the response that represents that the designated communication means can be used to home database 7. Mobility managing portion 17 receives the response and determines whether or not the call out side can change the communication means (at step S42). If the call out side can change the communication means, the flow returns to step S34. At step S34, mobility managing portion 17 performs the next call in control. If it is determined that the network on call out side does not respond at step S42 by timeout or disconnection of the terminal unit in call out, mobility managing portion 17 determines that the call out side cannot change the communication means and thereby terminates the location tracking operation. The aforementioned operation is continued until the tracking information block (1) to the tracking information block (4) are read at step S38.

Next, the following will explain the operation in a period of time after mobility managing portion 17 reads the tracking information block (1) at step S33 until setting of transmission channel to the designated subscriber via a certain call in address is completed. During the operation, mobility managing portion 17 supplies the call in address and a subscriber number to call out controlling portion 18 to let call out controlling portion 18 perform call in connection operation.

In the example shown in FIG. 3, since the tracking information block (1) is a tracking information block for a call in to subscriber terminal unit 10 in low speed mobile communication network 5, mobility managing portion 17 sends the content of the call in address (1) and the subscriber number to call out controlling portion 18 so as to cause call out controlling portion 18 to perform call in control. Call out controlling portion 18 routes the call in to low speed mobile communication network 5 shown in FIG. 1 corresponding to the content of the call in address (1). Low speed mobile communication network 5 passes subscriber number to location register 8 and inquires location register 8 whether or not the location of the subscriber A is registered on subscriber terminal unit 10 to which the call in address is designated. Location register 8 determines whether or not the subscriber A is on subscriber terminal unit 10, in other words whether or not subscriber A is location registered on subscriber terminal 10, based on the location registration information corresponding to subscriber terminal unit 10 and sends the result to low speed mobile communication network 5. If subscriber A is not on subscriber terminal unit 10, low speed mobile communication network 5 determines that a call in has not been sent to subscriber A of subscriber terminal unit 10 and sends the result to home database 7. When subscriber A is on subscriber terminal unit 10, low speed mobile communication network 5 calls subscriber A appending the subscriber number. Subscriber terminal unit 10 displays the subscriber number and when available optionally the subscriber name if appended on the display and make a beep informing call in. When subscriber A determines there is a call in addressed to him or her based on the subscriber number on the display, subscriber A enters the subscriber certification number with a key pad. When the subscriber certification number entered matches the subscriber certification number set upon insertion of subscriber card into subscriber terminal unit 10, subscriber terminal unit 10 determines that the authorized subscriber has responded and sends a reply signal to low speed mobile communication network 5. Low speed mobile communication network 5 informs home database 7 of the reply signal. Receiving the reply signal, home database 7 establishes a communication channel or notifies the response to the call out side to let the call out side establish communication channel. If the authorized subscriber does no respond, a timeout takes place in low speed mobile communication network 5. Thus, low speed mobile communication network 5 sends a message representing no response of the called subscriber to home database 7.

In this example, a call in is routed to home database 7. However, in the case that the network on call out side is an intelligent network, a call in is not routed to home database 7. In this case, the network on call out side simply asks home database 7 for tracking information. In this case, call out controlling portion 18 of home database 7 is disposed in the network on call out side rather than home database 7.

In the above explanation, if a location registered network/ means has not been registered, a tracking information block is generated corresponding to location registration update request issued by a subscriber and registered with home database 7. Instead, a tracking information block may be registered with home database 7 as mobility management information when the subscriber starts to subscribe to the network system.

FIG. 10 is a schematic diagram showing the structure of a mobility management system in a personal communication system according to a second embodiment of the present invention. Referring to FIG. 10, the mobility management system comprises wired telephone network 34, low speed mobile communication network 35, high speed mobile communication network 36, and center home database 37. Wired telephone network 34 accommodates telephone set 31 used in the home of subscriber A, telephone set 32 used in the company of subscriber A, and a facsimile 33 used in the company of subscriber A. Wired telephone network 34 has distributed home database (DHDB) 38a. Low speed mobile communication network 35 accommodates low speed mobile communication subscriber terminal unit 40 that is a terminal unit equivalent to a PHS telephone set. Low speed mobile communication network 35 has distributed home database 38b. High speed mobile communication network 36 accommodates high speed mobile communication subscriber terminal unit 41 that is a terminal unit equivalent to a telephone set of a portable telephone system. High speed mobile communication network 36 has distributed home database 38c. Center home database 37 is connected to wired telephone network 34, low speed mobile communication network 35, and high speed mobile communication network 36. In other words, the mobility management system in the personal communication system shown in FIG. 10 is different from that shown in FIG. 1 in that each network has a distributed home database.

FIGS. 11A and 11B are schematic diagrams showing the structures of distributed home databases 38a, 38b, and 38c. Distributed home database 38a shown in FIG. 11A comprises network controlling portion interface portion 46a, center home database interface portion 47, and mobility managing portion 48. Network controlling portion interface portion 46a is connected to a network controlling portion (not shown) of the local network, namely the wired telephone network 34. Center home database interface portion 47 is connected to center home database 37. Mobility managing portion 48 controls the management of the mobility of subscribers. Distributed home database 38b shown in FIG. 11B comprises network controlling portion interface portion 46b, center home database interface portion 47, and mobility managing portion 48. Network controlling portion interface portion 46b is connected to a network controlling portion (not shown) of the local network, namely the low speed mobile communication network 35. Center home database interface portion 47 is connected to center home database 37. Mobility managing portion 48 controls the management of the mobility of subscribers. Distributed home database 38c shown in FIG. 11B comprises network controlling portion interface portion 46b, center home database interface portion 47, and mobility managing portion 48. Network controlling portion interface portion 46b is connected to a network controlling portion (not shown) of the local network, namely the high speed mobile communication network 36. Center home database interface portion 47 is connected to center home database 37. Mobility managing portion 48 controls the management of the mobility of subscribers.

Network controlling portion interface portion 46a comprises a DTMF receiver. When network controlling portion interface portion 46a receives a location registration update request signal in the form of a DTMF signal from a terminal unit in wired telephone network 34 or a mobility management information change request signal for changing mobility management information in the distributed home database in the form of a DTMF signal, network controlling portion interface portion 46a converts the received signal into message information compatible with other networks and sends the resultant information to mobility managing portion 48.

FIG. 12 is a schematic diagram showing an example of mobility management information of each subscriber managed in center home database 37. Tracking information blocks (1) to (3) shown in FIG. 12 are managed in center home database 37. However, tracking information block (1) is also managed in distributed home database 38b. Tracking information block (2) is also managed in the distributed home database 38a. Tracking information block (3) is also managed in the distributed home database 38c. In FIG. 3, each tracking information block contains a call in address. However, in FIG. 12, each tracking information block contains a distributed home database address instead of a call in address.

FIG. 13 is a flow chart showing the operation of mobility managing portion 48 of the distributed home database in the case that it receives a location registration update request from a subscriber due to an update of the location of the subscriber.

Next, the location updating operation and the location tracking operation of the mobility management system in the personal communication system shown in FIG. 2 will be explained.

Similarly to the first embodiment, in FIG. 10, it is assumed that subscriber A has registered telephone set 31 used in the home of subscriber A, telephone set 32 used in the company of subscriber A, and facsimile set 33 used in the company with the wired telephone network 34. In addition, it is assumed that subscribe A has registered subscriber terminal unit 40 with low speed mobile communication network 35 and subscriber terminal unit 41 with high speed mobile communication network 36. Subscriber terminal unit 40 and subscriber terminal unit 41 may be combined in a single terminal unit that has a dual function. However, in this embodiment, subscriber terminal unit 40 and subscriber terminal unit 41 are independent terminal units. The mobility management information registered in distributed home database 38a of wired telephone network 34 is the same as the content of tracking information block (2) shown in FIG. 3. The mobility management information registered in distributed home database 38b of low speed mobile communication network 35 is the same as the content of tracking information block (1) shown in FIG. 3. The mobility management information registered in distributed home database 38c of high speed mobile communication network 36 is the same as the content of tracking information block (3) shown in FIG. 3. The content registered in the center home database 37 is the same as the content shown in FIG. 12.

Next, the location updating operation of the mobility management system in the personal communication system shown in FIG. 10 will be explained.

In this registered state, it is assumed that subscriber A arrives at home at 17:30 and turned on the power of the cordless child unit of the telephone set 31. The parent unit of telephone set 31 detects that the child unit (not shown) appears in the service area and sends a location registration update request of subscriber A as a location registration start request to wired telephone network 34. Wired telephone network 34 transmits the location registration update request to distributed home database 38a. Network controlling portion interface portion 46a of distributed home database 38a shown in FIG. 11 transfers the request to mobility managing portion 48. In other networks, when a subscriber terminal issues a location registration update request, the request is transferred to the relevant mobility managing portion 48 in the relevant network.

Next, with reference to a flow chart shown in FIG. 13, the operation of mobility managing portion 48 will be explained. Although distributed home databases 38a, 38b, and 38c have information of only relevant networks as mobility management information, the operations thereof are the same as the operation of mobility managing portion 17 of home database 7 shown in FIG. 5. However, since the distributed home databases 38a, 38b, and 38c are distributed home databases, an updating operation for center home database 37 is additionally required. Thus, instead of the operation on and after step S21 shown in FIG. 7, the operation on and after step S61 shown in FIG. 13 is performed. In the first embodiment, the location updating operation in high speed mobile communication network 6 was explained. In the second embodiment, the location updating operation in wired telephone network 34 will be explained. Mobility managing portion 48 selects either a designated address/means excluding mode or an all-other address/means excluding mode as tracking control information in wired telephone network 34. The designated address/means excluding mode excludes a designated address and communication means. The all-other address/means excluding mode excludes all other addresses and communication means. For example, to exclude telephone set 32 used in the company from a non-tracking object, the designated address/means excluding mode is selected. For another example, to exclude all other terminals, namely telephone set 32 used in the company and telephone set 33 used in the company, as non-tracking objects, the all-other address/means excluding mode is selected (at step S61). If it is determined that the designated address/means excluding mode is selected at step S61, mobility managing portion 48 sets the designated address and means as a non-tracking object (at step S62). If it is determined that the all-other address/means excluding mode is selected at step S61, mobility managing portion 48 sets all the other addresses/means as non-tracking objects (at step S63).

Next, mobility managing portion 48 determines whether or not the center home database should be updated (at step S64). If it is determined that the center home database should be updated at step S64, mobility managing portion 48 sends the location registration update request to center home database 37 through center home database interface portion 47 (at step S65) and completes the operation. The information elements contained in the location registration update request are similar to those shown in FIG. 4 except that the address of the distributed home database 38a is stored in the place of call in address shown in FIG. 4. If it is not necessary to update center home database 37, mobility managing portion 48 terminates the updating operation. In this example, since the location registration update request is issued as a location registration start request, it is assumed that the terminal unit was present in another network. Therefore, mobility managing portion 48 updates center home database 37. When a tracking condition from one local network to another network is set in center home database 37 or when a tracking condition in another network should be changed, center home database 37 should be updated. If the subscriber changes the registered location with the same communication means in the local network, it is not necessary to update center home database 37.

Next, concerning the operation of center home database 37 the operation of the mobility managing portion (not shown) in center home database 37 is the same as the operation of mobility managing portion 17. However, a call in address is an address in the distributed home database.

Next, the location tracking operation in the mobility management system in the personal communication system shown in FIG. 2 will be explained.

When a call in from one station in wired telephone network 34 to the subscriber A arises in the aforementioned registered state, in order to track the location of the telephone set of the subscriber A, wired telephone network 34 inquires distributed home database 38a thereof for the location of the telephone set of the subscriber A. Mobility managing portion 48 of distributed home database 38a performs the same tracking operation as the tracking operation shown in FIG. 8 of mobility managing portion 17 shown in FIG. 2. However, since distributed home database 38a does not have the call out controlling portion 18 shown in FIG. 2, in this case, the call out control is performed in the network. The result of call out control is sent to mobility managing portion 48. In addition, since distributed home database 38a has mobility management information for only subscribers whose locations have been registered, when a particular subscriber cannot be searched, mobility managing portion 48 inquires center home database 37 about the destination of the call in. Although the operation of center home database 37 is the same as the operation of mobility managing portion 17 shown in FIG. 8, responding to the inquiry from distributed home database on call out side, center home database 37 sends an address of the distributed home database of the call in network shown in FIG. 10 to the distributed home database of the network on call out side without the use of a call in address. Corresponding to this information, the network on call out side routes a call to the distributed home database of the network on call in side. In other words, in case that mobility managing portion 48 on the call out side does not manage subscriber information or in case that the tracking operation does not complete in the local network and thereby the next tracking operation is performed in another network, the tracking operation is performed with the use of mobility management information in center home database 37. In case that the mobility managing portion 48 makes inquiry to center home database 37 about each tracking information, center home database 37 determines the tracking condition of the next address. In case that the call out side receives all the information center home database 37 has, the distributed home database on the call out side determines the tracking condition of the next address.

As explained above, in the mobility management system in the personal communication system according to the present invention, a hybrid mobility management with the location updating operation and the location tracking operation is performed. Without unnecessary location registration update request or invalid control of connecting call out accompanying tracking, the connection to the present communication means of each subscriber can be established. Thus, a large scaled communication network such as a personal communication that integrates various communication networks can be easily structured. Consequently, for example, even if one of the terminal units of a called subscriber is in a building and thereby the call cannot reach to the terminal unit, the caller can communicate with the called subscriber with a terminal unit in a wired telephone network. Thus, even if a subscriber terminal unit is present in a building that shields a radio wave, a call to the subscriber is not abandoned.

In addition, with the above-explained communication network, even if the subscriber is not present in the service area of a communication network to which the location of a terminal unit of the subscriber is updated, a call can reach to the subscriber. Thus, a call to the subscriber is not abandoned.

The detaching method has been performed for preventing an invalid call from taking place in a situation that the field intensity fluctuates. The detaching operation causes channels between subscriber terminals and mobile communication network to congest. However, according to the present invention, the detaching operation can be eliminated.

In addition, different communication means can be explicitly registered as tracking information. When a communication means is changed while a terminal unit is being tracked, a call out subscriber can be informed of the changed communication means. Thus, since a plurality of terminal units of different communication means can be used, unlike the conventional location updating system in which location updating takes place only in mobile communication networks, the location of a terminal unit of each subscriber can be updated in wired telephone networks as well as in mobile networks. If a subscriber can access a telephone set in the wired telephone network in his or her neighbor, a call can reach to the telephone set. Thus, it is not necessary for this subscriber to inform people who often call him or her of the telephone number of the telephone set. Consequently, the time and the charge for telephone calls can be reduced.

In addition, because a terminal number can be used as a subscriber number without introducing a new number system, a subscriber can be tracked. Thus, without largely modifying software, a personal communication network with one number service for each subscriber can be structured. In addition, while a subscriber is traveling, accurate tracking information can be maintained. Thus, a mismatch of the tracking information and real location of the subscriber can be prevented. In addition, a no-response situation after a call in connection can be prevented. Thus, wasteful call in can be reduced.

Since subscriber information of mobility management such as tracking priority and deletion from a tracking object can be updated with a location registration update request, extra update request signals are not required. In addition, since home databases are distributed in respective communication networks, the number of signals for accessing to the subscriber database can be decreased. Thus, even if the service area becomes wide by introduction of a roaming service or the service area is subdivided for improving the efficiency of frequency utility and the location of the subscriber terminal unit is updated whenever the location registered areas is changed, the number of signals that are transmitted between each subscriber terminal and the mobile communication network can be reduced. Thus, the channels can be prevented from congesting. In addition, in case that a service that enables each subscriber to change tracking information is provided, even if the subscriber frequently changes the tracking information or there is much changed information in the tracking information, signals that are transmitted between each subscriber terminal and the mobile communication network can be prevented from increasing. Thus, channels can be prevented from congesting. Consequently, even if the scale of the aforementioned communication network becomes large, the service quality can be prevented from deteriorating.

In addition, since a parent unit of a cordless telephone set can monitor the location of a child unit and automatically send a location registration update signal to the network so that the child unit can be treated as a mobile communication terminal unit, a wired telephone set can be used as a terminal unit of a personal communication without the operation of the subscriber.

Although the present invention has been shown and described with respect to a best mode of embodiment thereof, it should be understood by those skilled in the art that the foregoing and various other changes, omissions, and additions in the form and detail thereof may be made therein without departing from the spirit and scope of the present invention.

What is claimed is:

1. A mobility management system in a personal communication system having a first home database for managing location registration information of a subscriber and said subscriber's personal information so as to control the connection of a call in by tracking the location of said subscriber corresponding to said location registration information which comprises:

a plurality of communication networks for receiving a location registration update request from a subscriber terminal unit and sending said location registration update request to said first home database, wherein said location registration update request represents a change of said location registration information due to power-on of said subscriber terminal unit used by said subscriber, traveling of said subscriber terminal unit, or the use of another terminal unit by said subscriber, wherein said location registration update request comprises:

(a) location registered network/means information comprising location registered communication network information which represents one of said plurality of communication networks with which said subscriber terminal is registered and terminal type information of said subscriber terminal unit;

(b) call in address information comprising a telephone number used for providing a service to said subscriber terminal unit in a relevant local network;

(c) order designation information for designating the priority of reference information that the first home database refers to so as to track the location of said subscriber terminal unit; and (d) tracking control information for designating a tracking method performed based on said location registered network/means information and said call in address information; and wherein said first home database comprises:

a mobility managing portion for managing a plurality of tracking information blocks and time information as mobility management information, for updating said priority data and internal information of each of said tracking information blocks based on said location registered network/means information, said call in address information, said order designation information, and said tracking control information included in the received location registration update request, for updating said mobility management information upon the reception of the mobility management information change request including information for changing said mobility management information generated corresponding to the schedule of said subscriber, said mobility management information change request being input by said subscriber and sent from said subscriber terminal unit through said communication networks, and for controlling the call in by tracking the location of said subscriber terminal unit corresponding to the information of said tracking information blocks upon occurrence of a call to said subscriber, each of said tracking information blocks including said location registered network/means information, said call in address information, said order designation information, and said tracking control information for each subscriber terminal unit, each of said tracking information blocks having the priority data referenced when the location of said subscriber terminal unit is tracked, and the time information representing a time zone in which said subscriber uses said subscriber terminal unit; and a call out controlling portion for controlling the connection of a call in corresponding to said mobility management information.

2. The mobility management system as set forth in claim 1, wherein at least one of said communication networks is a wired telephone network which receives said mobility management information change request in the form of a DTMF signal from a telephone set and transfers said mobility management information change request to said first home database, and wherein the first home database comprises:

means for converting said mobility management information change request in the form of said DTMF signal into digital message information.

3. The mobility management system as set forth in claim 2, wherein the telephone set is a cordless parent/child telephone set, a parent unit thereof detects whether or not a child unit thereof is present in a service area thereof and sends said location registration update request for said child unit to said first home database.

4. The mobility management system as set forth in claim 3, wherein said wired telephone network receives said location registration update request for said child unit of said cordless parent/child telephone set from said parent unit thereof in the form of said DTMF signal and transfers said location registration update request to said first home database, and wherein said first home database comprises:

means for converting said location registration update request in the form of said DTMF signal into digital message information.

5. The mobility management system as set forth in claim 1, wherein each of said communication networks comprises a second home database for managing said tracking information block corresponding to the respective local network which is one of said tracking information blocks in said mobility management information managed by said first home database, updating the relevant tracking information block upon the reception of said local registration update request, and controlling the call to said subscriber in the relevant communication network by tracking the location of said subscriber terminal unit corresponding to information of said tracking information block upon occurrence of a call in to said subscriber in the relevant communication network.

6. The mobility management system as set forth in claim 5, wherein said first home database manages routing information of said second home database and routes a call in for the subscriber to said second home database upon occurrence of an inquiry about said call in to said subscriber, and wherein said second home database extracts a call number of said subscriber from said relevant tracking information block so as to control said call in.

7. The mobility management system as set forth in claim 1, wherein the subscriber's personal information comprises one subscriber number, one subscriber name, and one subscriber certification number.

8. The mobility management system as set forth in claim 1, wherein the subscriber's personal information is one of numbers which constitute routing information assigned to a plurality of terminal units used by said subscriber, respectively.

9. The mobility management system as set forth in claim 1, wherein said mobility managing portion determines whether or not a tracking information block for said subscriber terminal that has sent said location registration update request is registered in said mobility managing information when said mobility managing portion receives said location registration update request from said subscriber, newly generates a tracking information block corresponding to the information included in said received location registration update request, registers said generated tracking information block with said mobility management information in case that said tracking information block is not registered, and updates the registered tracking information block corresponding to the information contained in said received location registration update request in case that said tracking information block is registered in said mobility management information.

10. The mobility management system as set forth in claim 1, wherein each of the tracking information blocks updates the information corresponding to said order designation information and said tracking control information contained in said mobility management information in accordance with said order designation information and said tracking control information in said location registration update request issued by said subscriber, and wherein if said location registration update request issued by said subscriber does not includes said order designation information and said tracking control information, each of the tracking information blocks does not update the information corresponding to said order designation information and said tracking control information.

11. The mobility management system as set forth in claim 1, wherein when said tracking control information of said location registration update request issued by said subscriber or said order designation information in said mobility management information designates a communication network or a communication means as a non-tracking object, said mobility managing portion track the locations of said subscriber terminal units excluding said designated communication network or said communication means.

12. The mobility management system as set forth in claim 1, wherein said mobility managing portion successively references said tracking information blocks in accordance with the priority so as to track the location of said subscriber terminal units;

wherein when communication means on the call in side is changed, said mobility managing portion informs a subscriber on the call out side of changed communication means on the call in side with voice or character string and said subscriber terminal unit on call out side which is informed of the change of the communication means on call in side performs checking to determine whether or not a communication between the terminal unit on the call out side and the call in side through said changed communication means on the call in side can be established;

wherein if it is determined that the communication cannot be established, said subscriber terminal unit in call out side informs said first home database of the determined result and terminates the location tracking operation;

wherein if it is not determined whether or not the communication can be established, said subscriber terminal unit in call out side informs said subscriber in call out side of the result and said mobility management portion tracks the location of said subscriber terminal unit in call in side corresponding to information entered by said subscriber in call out side through a key pad; and wherein if it is determined that the communication can be made, said subscriber terminal unit in call out side changes the communication means and said mobility managing portion tracks the location of said subscriber terminal unit in call in side.

13. The mobility management system as set forth in claim 1, wherein the mobility management information change information comprises: changed information of said location to registered network, said terminal type information of said subscriber terminal unit, said call in address information and time information concerning the time when said subscriber uses said subscriber terminal unit in said mobility management information; tracking order designation information; and tracking control information.

14. A mobility management system in a personal communication system having a first home database for managing a location registration information for a subscriber and subscriber's personal information so as to control the connection of a call in by tracking the location of said subscriber corresponding to said location registration information and said subscriber's personal information, which comprises:

- a low speed mobile communication network, connected to a first subscriber terminal unit which is a low speed mobile communication terminal unit equivalent to a telephone terminal in a simple portable telephone system, for managing first location registration information of a subscriber who uses said first subscriber terminal unit, receiving a first location registration update request representing a change of said first location registration information due to power-on of said first subscriber terminal unit or traveling of the first subscriber terminal unit from said first subscriber terminal unit, updating said first location registration information, and transferring said first location registration update request to said first home database;
- a high speed mobile communication network, connected to a second subscriber terminal unit which is a high speed mobile communication terminal unit equivalent to a telephone terminal unit in a portable telephone system, for managing second location registration information of a subscriber who uses said second subscriber terminal unit, receiving a second location registration update request that represents a change of the second location registration information due to power-on or traveling of said second subscriber terminal unit from said second subscriber terminal unit, updating said second location registration information, and transferring said second location registration update request to the first home database; and
- a wired telephone network, connected to a third subscriber terminal unit which is a telephone set or a facsimile machine, for managing third location registration information of a subscriber who uses said third subscriber terminal unit, receiving a third location registration update request that represents that said subscriber uses said third subscriber terminal unit from said third subscriber terminal, updating said third location registration information, and transferring said third location registration update request to said first home database, wherein each of said first location registration update request, said second location registration update request, and said third location registration update request comprises:

(a) location registered network/means information comprising location registered network information representing a network with which the location of the relevant subscriber terminal unit is registered and terminal unit type information of said subscriber terminal unit;

(b) call in address information comprising a number that is routing information used to provide a service to said subscriber terminal unit in the relevant local network;

(c) order designation information for designating the priority of reference to a plurality of pieces of reference information with which said first home database tracks the location of said subscriber; and (d) tracking control information for designating a tracking method which is performed based on the location registered network/means information and the call in address information, and wherein the first home database comprises:

a mobility managing portion for managing a plurality of tracking information blocks and time information as mobility management information, each of said tracking information blocks comprising said location registered network/means information, said call in address information, said order designation information, and said tracking control information for each subscriber terminal unit, each of said tracking information blocks having priority data referenced when the location of said subscriber terminal units are tracked, each of said tracking information being referenced according to said priority while the location of subscriber terminal units are tacked, the time information representing a time zone in which said subscriber uses said subscriber terminal unit;

for updating the priority data and internal information of each of said tracking information blocks corresponding to said location registered network/means information, said call in address information, said order designation information, and said tracking control information included in the first, second, and third received location registration update requests;

for updating said mobility management information upon the reception of said mobility management information change request comprising information for changing said mobility management information generated corresponding to a schedule of said subscriber, said mobility management information change request being input by said subscriber and sent from said first, second, or third subscriber terminal units through said low speed mobile communication network, said high speed mobile communication network, or said wired telephone network, respectively;

for tracking the location of the subscriber terminal unit corresponding to the tracking information blocks upon occurrence of a call in to the subscriber, and for controlling the call in to the subscriber;

- a low speed mobile communication network interface portion, having an interface circuit connecting said low speed mobile communication network to said mobility managing portion, for transferring said first location registration update request received from said low speed mobile communication network to said mobility managing portion;
- a high speed mobile communication network interface portion, having an interface circuit connecting said high speed mobile communication network to said mobility managing portion, for transferring said second location registration update request received from said high speed mobile communication network to said mobility managing portion;
- a wired telephone network interface portion, having an interface circuit connecting said wired telephone network to said mobility managing portion, for transferring said third location registration update request received from said wired telephone network to said mobility managing portion; and
- a call out controlling portion for controlling the connection of a call in corresponding to said mobility management information.

15. The mobility management system as set forth in claim 14, wherein said wired telephone network receives said mobility management information change request in the form of a DTMF signal from the telephone set and transfers said mobility management information change request to said first home database, and wherein said first home database has means for converting said mobility management information change request into digital message information.

16. The mobility management system as set forth in claim 15, wherein said telephone set is a cordless parent/child telephone set, a parent unit thereof detects whether or not a child unit thereof is present in a service area thereof and sends a location registration update request for said child unit to said first home database.

17. The mobility management system as set forth in claim 16, wherein said wired telephone network interface portion of said first home database receives a location registration update request of said child unit of said cordless parent/child telephone set in the form of the DTMF signal, converts the location registration update request into the message information compatible with said first location registration update request and said second location registration update request, and sends the resultant information to said mobility managing portion.

18. The mobility management system as set forth in claim 14, wherein each of said low speed mobile communication network, said high speed mobile communication network, and said wired telephone network has a second home database for managing a tracking information block corresponding to the relevant local network which is one of said tracking information blocks in the mobility management information managed by said first home database, updating the relevant tracking information block in the reception of the first, second, and third location registration update request, respectively, and controlling call in by tracking said location of the subscriber terminal unit corresponding to information of said tracking information block upon occurrence of a terminating call to said subscriber in the relevant local network.

19. The mobility management system as set forth in claim 18, wherein said first home database manages the routing information of said second home database and routes a terminating call for said subscriber to said second home database upon occurrence of an inquiry of the call in to said subscriber, and wherein said second home database extracts a call number of said subscriber from said relevant tracking information block so as to control said call in.

20. The mobility management system as set forth in claim 14, wherein the subscriber's personal information comprises one subscriber number, one subscriber name, and one subscriber certification number.

21. The mobility management system as set forth in claim 14, wherein the subscriber's personal information is one of numbers which constitute routing information assigned to a plurality of terminal units used by said subscriber, respectively.

22. The mobility management system as set forth in claim 14, wherein said mobility managing portion determines whether or not a tracking information block for said subscriber terminal that has sent said location registration update request is registered in said mobility managing information when said mobility managing portion receives said location registration update request from said subscriber, newly generates a tracking information block corresponding to the information included in said received location registration update request, registers said generated tracking information block with said mobility management information in case that said tracking information block is not registered, and updates the registered tracking information block corresponding to the information contained in said received location registration update request in case that said tracking information block is registered in said mobility management information.

23. The mobility management system as set forth in claim 22, wherein each of the tracking information blocks updates the information corresponding to said order designation information and said tracking control information contained in said mobility management information in accordance with said order designation information and said tracking control information in said location registration update request issued by said subscriber, and wherein if said location registration update request issued by said subscriber does not includes said order designation information and said tracking control information, each of the tracking information blocks does not update the information corresponding to said order designation information and said tracking control information.

24. The mobility management system as set forth in claim 14, wherein each of the tracking information blocks updates the information corresponding to said order designation information and said tracking control information contained in said mobility management information in accordance with said order designation information and said tracking control information in said location registration update request issued by said subscriber, and wherein if said location registration update request issued by said subscriber does not includes said order designation information and said tracking control information, each of the tracking information blocks does not update the information corresponding to said order designation information and said tracking control information.

25. The mobility management system as set forth in claim 14, wherein when said tracking control information of said location registration update request issued by said subscriber or said order designation information in said mobility management information designates a communication network or a communication means as a non-tracking object, said mobility managing portion track the locations of said subscriber terminal units excluding said designated communication network or said communication means.

26. The mobility management system as set forth in claim 14, wherein said mobility managing portion successively references said tracking information blocks in accordance with the priority so as to track the location of said subscriber terminal units;

wherein when communication means on the call in side is changed, said mobility managing portion informs a subscriber on the call out side of changed communication means on the call in side with voice or character string and said subscriber terminal unit on call out side which is informed of the change of the communication means on call in side performs checking to determine whether or not a communication between the terminal unit on the call out side and the call in side through said changed communication means on the call in side can be established;

wherein if it is determined that the communication cannot be established, said subscriber terminal unit in call out side informs said first home database of the determined result and terminates the location tracking operation;

wherein if it is not determined whether or not the communication can be established, said subscriber terminal unit in call out side informs said subscriber in call out side of the result and said mobility management portion tracks the location of said subscriber terminal unit in call in side corresponding to information entered by said subscriber in call out side through a key pad; and wherein if it is determined that the communication can be made, said subscriber terminal unit in call out side changes the communication means and said mobility managing portion tracks the location of said subscriber terminal unit in call in side.

27. The mobility management system as set forth in claim 14, wherein the mobility management information change information comprises: changed information of said location registered network, said terminal type information of said subscriber terminal unit, said call in address information and time when information concerning the time said subscriber uses said subscriber terminal unit in said mobility management information; tracking order designation information; and tracking control information.

* * * * *